US012053949B2

(12) United States Patent
Pettersson et al.

(10) Patent No.: US 12,053,949 B2
(45) **Date of Patent: *Aug. 6, 2024**

(54) CONVERTING MACHINE

(71) Applicant: PACKSIZE LLC, Salt Lake City, UT (US)

(72) Inventors: Niklas Pettersson, Västerås (SE); Ryan Osterhout, West Haven, UT (US)

(73) Assignee: PACKSIZE LLC, Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/214,362

(22) Filed: Jun. 26, 2023

(65) Prior Publication Data

US 2024/0059041 A1 Feb. 22, 2024

Related U.S. Application Data

(60) Continuation of application No. 17/082,294, filed on Oct. 28, 2020, now Pat. No. 11,731,385, which is a (Continued)

(51) Int. Cl.
*B31B 50/14* (2017.01)
*B26D 1/18* (2006.01)

(Continued)

(52) U.S. Cl.
CPC ................ *B31B 50/14* (2017.08); *B26D 1/18* (2013.01); *B26D 1/185* (2013.01); *B26D 7/2635* (2013.01);

(Continued)

(58) Field of Classification Search
CPC .. B26D 1/18; B26D 1/185; B26D 2007/0093; B26D 3/08; B26D 5/00; B26D 7/2635;

(Continued)

(56) References Cited

U.S. PATENT DOCUMENTS

| | | | |
|---|---|---|---|
| 1,183,744 | A | 5/1916 | Leach |
| 1,809,853 | A | 6/1931 | Knowlton |

(Continued)

FOREIGN PATENT DOCUMENTS

| | | | |
|---|---|---|---|
| CN | 2164350 | Y | 5/1994 |
| CN | 1191833 | A | 9/1998 |

(Continued)

OTHER PUBLICATIONS

International Preliminary Report on Patentability received for PCT Patent Application No. PCT/US17/036603, mailed on Dec. 27, 2018, 7 pages.

(Continued)

*Primary Examiner* — Valentin Neacsu
(74) *Attorney, Agent, or Firm* — Quarles & Brady LLP

(57) ABSTRACT

A system that converts sheet material into packaging templates includes a converting assembly that performs conversion functions, such as cutting, creasing, and scoring, on the sheet material as the sheet material moves through the converting machine in a first direction. The converting assembly may be mounted on a frame such that the converting assembly is elevated above a support surface. One or more longhead converting tools performs conversion functions on the sheet material in a first direction and a crosshead converting tool performs conversion functions on the sheet material in a second direction in order to create packaging templates.

19 Claims, 22 Drawing Sheets

Related U.S. Application Data division of application No. 15/901,089, filed on Feb. 21, 2018, now Pat. No. 11,400,680, which is a continuation of application No. 14/357,190, filed as application No. PCT/US2012/064403 on Nov. 9, 2012, now Pat. No. 9,969,142.

(60) Provisional application No. 61/643,267, filed on May 5, 2012, provisional application No. 61/640,686, filed on Apr. 30, 2012, provisional application No. 61/558,298, filed on Nov. 10, 2011.

(51) Int. Cl.

| | |
|---|---|
| ***B26D 7/26*** | (2006.01) |
| ***B26D 9/00*** | (2006.01) |
| ***B31B 50/20*** | (2017.01) |
| ***B65H 29/52*** | (2006.01) |
| *B26D 3/08* | (2006.01) |
| *B26D 5/00* | (2006.01) |
| *B26D 7/00* | (2006.01) |
| *B26F 1/00* | (2006.01) |
| *B31B 50/25* | (2017.01) |

(52) U.S. Cl.
CPC ................ *B26D 9/00* (2013.01); *B31B 50/20* (2017.08); *B65H 29/52* (2013.01); *B26D 3/08* (2013.01); *B26D 5/00* (2013.01); *B26D 2007/0093* (2013.01); *B26F 1/00* (2013.01); *B31B 50/146* (2017.08); *B31B 50/256* (2017.08); *B65B 2210/04* (2013.01)

(58) Field of Classification Search
CPC ..... B26D 9/00; B26D 2007/2657; B26F 1/00; B31B 1/00; B31B 1/20; B31B 2201/14; B31B 2201/143; B31B 2201/147; B31B 2201/257; B65B 2210/04
USPC ... 493/340, 370, 395, 396, 405, 52, 56, 350, 493/353, 464, 407, 185; 83/549
See application file for complete search history.

(56) References Cited

U.S. PATENT DOCUMENTS 1,924,160 A 8/1933 Knowlton
2,077,428 A 4/1937 Mabon
2,083,351 A 6/1937 Sidebotham
2,181,117 A 11/1939 Brenn
2,256,082 A 9/1941 Feurt
2,353,419 A 7/1944 Smithson
2,395,352 A 2/1946 Staude et al.
2,449,663 A * 9/1948 Marcalus ............... B65H 45/20 270/39.07
2,609,736 A 9/1952 Montgomery
2,631,509 A 3/1953 Whytlaw
2,679,195 A 5/1954 Whytlaw
2,699,711 A 1/1955 Mobley
2,798,582 A 7/1957 Monroe et al.
2,853,177 A 9/1958 Engleson et al.
2,904,789 A 9/1959 Radin et al.
3,039,369 A 6/1962 Welsh
3,057,267 A 10/1962 Johnson, Jr.
3,096,692 A 7/1963 Crathern et al.
3,105,419 A 10/1963 La Bombard
3,108,515 A 10/1963 Stohlquist
3,152,526 A 10/1964 Dunton
3,153,991 A 10/1964 Goodrich
3,218,940 A 11/1965 Pearson
3,285,145 A 11/1966 Lieberman
3,303,759 A 2/1967 Burke
3,308,723 A 3/1967 Bergh, Jr.
3,332,207 A 7/1967 Midnight
3,406,611 A 10/1968 Benjamin et al.
3,418,893 A 12/1968 Stohlquist et al.
3,469,508 A 9/1969 Klapp
3,511,496 A 5/1970 Rudolf
3,543,469 A 12/1970 Ullman
3,555,776 A 1/1971 Nigrelli et al.
3,566,755 A 3/1971 Smith et al.
3,611,884 A 10/1971 Hottendorf
3,618,479 A 11/1971 Shields
3,620,114 A 11/1971 Chudyk
3,628,408 A 12/1971 Rod
3,646,418 A 2/1972 Sterns et al.
3,743,154 A 7/1973 Brewitz
3,744,106 A * 7/1973 Mayr ...................... B29C 55/06 425/445
3,756,586 A 9/1973 Craft
3,763,750 A 10/1973 Reichert
3,776,109 A 12/1973 Clark et al.
3,803,798 A 4/1974 Clancy
3,804,514 A 4/1974 Jasinski
3,807,726 A 4/1974 Hope et al.
3,866,391 A 2/1975 Puskarz et al.
3,882,764 A 5/1975 Johnson
3,886,833 A 6/1975 Gunn et al.
3,891,203 A 6/1975 Schiff
3,912,389 A 10/1975 Miyamoto
3,913,464 A 10/1975 Flaum
3,949,654 A 4/1976 Stehlin
3,986,319 A 10/1976 Puskarz et al.
4,033,217 A 7/1977 Flaum et al.
4,036,115 A 7/1977 Hatch
4,044,658 A 8/1977 Mitchard
4,052,048 A 10/1977 Shirasaka
4,053,152 A 10/1977 Matsumoto
4,056,025 A 11/1977 Rubel
4,094,451 A 6/1978 Wescoat
4,121,506 A 10/1978 Van Grouw
4,123,966 A 11/1978 Buschor
4,133,254 A 1/1979 Odom et al.
4,162,870 A 7/1979 Storm
4,164,171 A 8/1979 Gorshe et al.
4,173,106 A 11/1979 Leasure et al.
4,184,770 A 1/1980 Pinior
4,191,467 A 3/1980 Schieck
4,221,373 A 9/1980 Mueller Hans
4,222,557 A 9/1980 Wu
4,224,847 A 9/1980 Tokuno
4,252,233 A 2/1981 Joice
4,261,239 A 4/1981 Toboshi et al.
4,264,200 A 4/1981 Tickner et al.
4,295,841 A 10/1981 Ward, Jr.
4,320,960 A 3/1982 Ward et al.
4,342,562 A 8/1982 Froeidh et al.
4,351,461 A 9/1982 Carlsson
4,368,052 A 1/1983 Bitsky et al.
4,373,412 A 2/1983 Gerber et al.
4,375,970 A 3/1983 Murphy et al.
4,401,250 A 8/1983 Carlsson
4,449,349 A 5/1984 Roth
4,480,827 A * 11/1984 Shultz ................. B65H 3/5207 271/157
4,487,596 A 12/1984 Livens et al.
4,563,169 A 1/1986 Virta et al.
4,578,054 A 3/1986 Herrin
D286,044 S 10/1986 Kando
4,618,342 A 10/1986 Borel
4,638,696 A 1/1987 Urwyler
4,674,734 A 6/1987 Ibuchi
4,684,360 A 8/1987 Tokuno et al.
4,695,006 A 9/1987 Pool
4,714,946 A 12/1987 Bajgert et al.
4,743,131 A 5/1988 Atwell
4,749,295 A 6/1988 Bankier et al.
4,773,781 A 9/1988 Bankier
4,838,468 A 6/1989 Lesse
4,844,316 A 7/1989 Keeny
4,847,632 A 7/1989 Norris
4,878,521 A 11/1989 Fredrickson
4,887,412 A 12/1989 Takamura
4,923,188 A 5/1990 Neir

(56) References Cited

U.S. PATENT DOCUMENTS 4,931,031 A 6/1990 Lisiecki
4,932,930 A 6/1990 Coalier et al.
4,979,932 A 12/1990 Burnside
4,994,008 A 2/1991 Haake et al.
4,996,898 A 3/1991 Miller et al.
5,005,816 A 4/1991 Stemmler et al.
5,024,641 A 6/1991 Boisseau
5,030,192 A 7/1991 Sager
5,035,373 A * 7/1991 Perrigo .............. B65H 19/2215 242/413.3
5,039,242 A 8/1991 Johnson
5,046,716 A 9/1991 Lippold
5,058,872 A 10/1991 Gladow
5,072,641 A 12/1991 Urban et al.
5,074,836 A 12/1991 Fechner et al.
5,081,487 A 1/1992 Hoyer et al.
5,090,281 A * 2/1992 Paulson ................. B26D 7/088 83/508.3
5,094,660 A 3/1992 Okuzawa
5,106,359 A 4/1992 Lott
5,111,252 A 5/1992 Hamada et al.
5,116,034 A 5/1992 Trask et al.
5,118,093 A 6/1992 Makiura et al.
5,120,279 A 6/1992 Rabe
5,120,297 A 6/1992 Adami
5,123,890 A 6/1992 Green, Jr.
5,123,894 A 6/1992 Bergeman et al.
5,137,172 A 8/1992 Wagner et al.
5,137,174 A 8/1992 Bell
5,148,654 A 9/1992 Kisters
5,154,041 A 10/1992 Schneider
5,157,903 A 10/1992 Nakashima et al.
5,197,366 A * 3/1993 Paulson ................. B26D 1/225 83/675
5,240,243 A 8/1993 Gompertz et al.
5,241,353 A 8/1993 Maeshima et al.
5,259,255 A 11/1993 Urban et al.
5,263,785 A 11/1993 Negoro et al.
D344,751 S 3/1994 Keong
5,305,993 A 4/1994 Staeb
5,321,464 A 6/1994 Jessen et al.
5,335,777 A 8/1994 Murphy et al.
5,358,345 A 10/1994 Damitio
5,369,939 A 12/1994 Moen et al.
5,375,390 A 12/1994 Frigo et al.
5,397,423 A 3/1995 Bantz et al.
5,411,252 A 5/1995 Lowell
5,531,661 A 7/1996 Moncrief
5,584,633 A 12/1996 Scharer
5,586,758 A 12/1996 Kimura et al.
5,624,369 A 4/1997 Bidlack et al.
5,667,468 A 9/1997 Bandura
5,671,593 A 9/1997 Ginestra et al.
5,716,313 A 2/1998 Sigrist et al.
5,727,725 A 3/1998 Paskvich
5,767,975 A 6/1998 Ahlen
5,779,617 A 7/1998 Larkin et al.
5,836,498 A 11/1998 Turek
5,865,918 A 2/1999 Franklin et al.
5,887,867 A 3/1999 Takahashi et al.
5,902,223 A 5/1999 Simmons
5,927,702 A 7/1999 Ishii et al.
5,941,451 A 8/1999 Dexter
5,951,454 A 9/1999 Adami
5,964,686 A 10/1999 Bidlack et al.
6,000,525 A 12/1999 Frulio
6,071,222 A 6/2000 Schneider
6,071,223 A 6/2000 Reider et al.
6,076,764 A * 6/2000 Robinson ............. B65H 16/005 242/596.7
6,079,188 A * 6/2000 Katayama ............... B65B 41/16 53/64
6,107,579 A 8/2000 Kinnemann
6,113,525 A 9/2000 Waechter
6,132,348 A 10/2000 Gross et al.
6,135,438 A 10/2000 Newman et al.
6,164,045 A 12/2000 Focke et al.
6,179,765 B1 * 1/2001 Toth ....................... B65H 16/06 493/464
6,189,933 B1 2/2001 Felderman
6,190,297 B1 2/2001 Croft
6,244,436 B1 6/2001 Boriani et al.
6,245,004 B1 6/2001 Waters
6,321,650 B1 11/2001 Ogawa et al.
6,397,557 B1 6/2002 Bassissi et al.
6,428,000 B1 * 8/2002 Hara ...................... B65H 31/20 271/223
6,460,313 B1 10/2002 Cooper
6,471,154 B2 10/2002 Toth
6,553,207 B2 4/2003 Tsusaka et al.
6,565,499 B2 5/2003 Benzoni
6,568,865 B1 5/2003 Fujioka et al.
6,673,001 B2 1/2004 Toth
6,690,476 B1 2/2004 Hren
6,709,177 B1 3/2004 Sugimura
6,830,328 B2 12/2004 Cuyler, Jr.
6,837,135 B2 1/2005 Michalski
6,840,898 B2 1/2005 Pettersson
6,910,997 B1 6/2005 Yampolsky et al.
6,926,653 B2 8/2005 Georgiades
6,968,859 B1 11/2005 Nagano et al.
7,060,016 B2 6/2006 Cipolli
7,100,811 B2 9/2006 Pettersson et al.
7,115,086 B1 10/2006 Campbell, Jr.
7,121,543 B2 10/2006 Fujioka
7,201,089 B2 4/2007 Richter
7,237,969 B2 7/2007 Bartman
7,537,557 B2 5/2009 Holler
7,618,038 B2 * 11/2009 Aida ........................ B65H 1/04 271/145
7,637,857 B2 12/2009 Coullery et al.
7,641,190 B2 1/2010 Hara et al.
7,647,752 B2 1/2010 Magnell
7,648,451 B2 1/2010 Calugi
7,648,596 B2 1/2010 Sharpe et al.
7,690,099 B2 4/2010 Bapst et al.
7,735,299 B2 6/2010 Cash, III
7,739,856 B2 6/2010 Cash, III
7,819,791 B1 10/2010 Ross
7,997,578 B2 8/2011 Saito et al.
8,011,284 B2 9/2011 Rinaldo
8,052,138 B2 * 11/2011 Wang ....................... B65H 1/04 271/118
8,141,868 B1 * 3/2012 Wang ....................... B65H 1/04 271/248
8,480,550 B2 7/2013 Taketsugu
8,646,248 B2 2/2014 Iwasa et al.
D703,246 S 4/2014 Pettersson et al.
8,999,108 B2 4/2015 Nagao et al.
9,027,315 B2 5/2015 Tsutsumi et al.
9,027,737 B2 5/2015 Talken et al.
9,069,151 B2 6/2015 Conner
9,120,284 B2 9/2015 Capoia
9,199,794 B2 12/2015 Nadachi et al.
9,216,867 B2 * 12/2015 Aoyama .................. B65H 1/04
9,329,565 B2 5/2016 Osaki
9,352,526 B2 5/2016 Pettersson
9,434,496 B2 9/2016 Sytema
9,771,231 B2 9/2017 Pettersson
9,924,502 B2 3/2018 Choi
9,969,142 B2 * 5/2018 Pettersson ................ B26D 1/18
10,093,438 B2 10/2018 Pettersson
10,155,352 B2 12/2018 Sytema et al.
10,286,621 B2 5/2019 Toro
10,328,590 B2 6/2019 Bormann et al.
10,583,943 B2 3/2020 Feijen et al.
10,759,079 B2 9/2020 Smithwick
10,836,516 B2 11/2020 Pettersson
10,836,517 B2 11/2020 Ponti
11,400,680 B2 * 8/2022 Pettersson ................ B26D 1/18
2002/0017754 A1 2/2002 Kang
2002/0066683 A1 6/2002 Sanders
2002/0091050 A1 7/2002 Bacciottini et al.

(56) References Cited

U.S. PATENT DOCUMENTS

2002/0108476 A1 8/2002 Guidetti
2002/0115548 A1 8/2002 Lin et al.
2002/0125712 A1 9/2002 Felderman
2002/0139890 A1 10/2002 Toth
2002/0174640 A1 11/2002 Fox
2003/0102244 A1 6/2003 Sanders
2003/0104911 A1 6/2003 Toth et al.
2003/0106899 A1 6/2003 Langen
2003/0191001 A1 10/2003 Guiot et al.
2003/0217628 A1 11/2003 Michalski
2004/0060264 A1 4/2004 Miller
2004/0082453 A1 4/2004 Pettersson
2004/0089692 A1 5/2004 Pettersson et al.
2004/0092374 A1 5/2004 Cheng
2004/0144555 A1 7/2004 Buekers et al.
2004/0173068 A1 9/2004 Adachi
2004/0198577 A1 10/2004 Blumle
2004/0214703 A1 10/2004 Berens et al.
2004/0261365 A1 12/2004 White
2005/0079965 A1 4/2005 Moshier et al.
2005/0103923 A1 5/2005 Pettersson et al.
2005/0215409 A1 9/2005 Abramson et al.
2005/0280202 A1 12/2005 Vila et al.
2006/0082044 A1* 4/2006 Aida ........................ B65H 1/04 271/145
2006/0178248 A1 8/2006 Coullery et al.
2006/0180438 A1 8/2006 Mosli et al.
2006/0180991 A1 8/2006 Nakahata et al.
2006/0181008 A1 8/2006 Van et al.
2007/0079575 A1 4/2007 Monti
2007/0227927 A1 10/2007 Coltri-Johnson
2007/0228119 A1 10/2007 Barner
2007/0287623 A1 12/2007 Carlson et al.
2007/0289253 A1 12/2007 Miller
2008/0020916 A1 1/2008 Magnell
2008/0037273 A1 2/2008 Muehlemann et al.
2008/0066632 A1 3/2008 Raueiser
2008/0115641 A1 5/2008 Freyburger et al.
2008/0148917 A1 6/2008 Pettersson
2008/0300120 A1 12/2008 Sato
2009/0062098 A1 3/2009 Inoue et al.
2009/0178528 A1 7/2009 Adami
2009/0199527 A1 8/2009 Wehr et al.
2009/0223180 A1 9/2009 Martocchio et al.
2010/0011924 A1 1/2010 Bernreuter
2010/0012628 A1 1/2010 Koshy et al.
2010/0041534 A1 2/2010 Harding et al.
2010/0111584 A1 5/2010 Shiohara et al.
2010/0206582 A1 8/2010 Meyyappan et al.
2010/0210439 A1 8/2010 Goto
2010/0236431 A1 9/2010 Roberts et al.
2011/0026999 A1 2/2011 Kohira
2011/0053746 A1 3/2011 Desertot et al.
2011/0092351 A1 4/2011 Hatano et al.
2011/0099782 A1 5/2011 Schonberger et al.
2011/0110749 A1 5/2011 Carter et al.
2011/0171002 A1 7/2011 Pettersson
2011/0229191 A1 9/2011 Nomi
2011/0230325 A1 9/2011 Harding et al.
2011/0240707 A1 10/2011 Beguin et al.
2011/0269995 A1 11/2011 Olbert et al.
2011/0271812 A1 11/2011 Maier et al.
2011/0283855 A1 11/2011 Kwarta et al.
2011/0319242 A1 12/2011 Pettersson
2012/0021884 A1 1/2012 Musha
2012/0037680 A1 2/2012 Ito
2012/0106963 A1 5/2012 Huang et al.
2012/0122640 A1 5/2012 Pazdernik et al.
2012/0129670 A1 5/2012 Pettersson et al.
2012/0139670 A1 6/2012 Yamagata et al.
2012/0142512 A1 6/2012 Keller
2012/0222937 A1 9/2012 Talken et al.
2012/0242512 A1 9/2012 Horstemeyer
2012/0275838 A1 11/2012 Imazu et al.
2012/0319920 A1 12/2012 Athley et al.
2012/0328253 A1 12/2012 Hurley et al.
2013/0000252 A1 1/2013 Pettersson et al.
2013/0045847 A1* 2/2013 Capoia .................. B26D 11/00 493/59
2013/0104718 A1 5/2013 Tai
2013/0108227 A1 5/2013 Conner
2013/0108408 A1 5/2013 Saison et al.
2013/0130877 A1 5/2013 Su
2013/0146355 A1 6/2013 Strasser et al.
2013/0210597 A1 8/2013 Pettersson
2013/0267397 A1 10/2013 Hoover et al.
2013/0294735 A1 11/2013 Burris et al.
2013/0333538 A1 12/2013 Long et al.
2014/0047796 A1 2/2014 Liao
2014/0059977 A1 3/2014 Boegli
2014/0078635 A1 3/2014 Conner et al.
2014/0091511 A1 4/2014 Martin
2014/0100100 A1 4/2014 Izumichi
2014/0101929 A1 4/2014 Kim et al.
2014/0121093 A1 5/2014 Braschoss et al.
2014/0140671 A1 5/2014 Islam
2014/0141956 A1 5/2014 Suzuki et al.
2014/0162862 A1 6/2014 Shimura et al.
2014/0171283 A1 6/2014 Furuhashi et al.
2014/0179504 A1 6/2014 Nakada et al.
2014/0206518 A1 7/2014 Hidaka et al.
2014/0315701 A1 10/2014 Pettersson
2014/0316336 A1 10/2014 Hawasheen
2014/0318336 A1 10/2014 De Marco et al.
2014/0336026 A1 11/2014 Pettersson
2014/0357463 A1 12/2014 Kojima
2015/0018189 A1 1/2015 Pettersson et al.
2015/0019387 A1 1/2015 Pettersson et al.
2015/0045197 A1 2/2015 Sugiyama et al.
2015/0053349 A1 2/2015 Mori et al.
2015/0055926 A1 2/2015 Strasser et al.
2015/0103923 A1 4/2015 Ramasubramonian et al.
2015/0148210 A1 5/2015 Sibthorpe
2015/0155697 A1 6/2015 Loveless et al.
2015/0224731 A1 8/2015 Ponti
2015/0273897 A1 10/2015 Kato et al.
2015/0355429 A1 12/2015 Villegas et al.
2015/0360433 A1 12/2015 Feijen et al.
2015/0360801 A1 12/2015 Sytema
2016/0001441 A1 1/2016 Osterhout et al.
2016/0049782 A1 2/2016 Strasser et al.
2016/0121572 A1 5/2016 Giancaterino
2016/0122044 A1 5/2016 Evers et al.
2016/0184142 A1 6/2016 Vanvalkenburgh et al.
2016/0185065 A1 6/2016 Sytema et al.
2016/0185475 A1 6/2016 Pettersson
2016/0229145 A1 8/2016 Pettersson et al.
2016/0241468 A1 8/2016 Sabella et al.
2016/0340067 A1 11/2016 Winkler et al.
2017/0057190 A1 3/2017 Toro
2017/0190134 A1 7/2017 Van et al.
2017/0355166 A1 12/2017 Jonker
2017/0361560 A1 12/2017 Osterhout
2018/0015260 A1 1/2018 Sano et al.
2018/0050833 A1 2/2018 Sytema et al.
2018/0178476 A1* 6/2018 Pettersson ............... B31B 50/14
2018/0201465 A1 7/2018 Osterhout
2018/0264766 A1 9/2018 Veis
2018/0265228 A1 9/2018 Hagestedt et al.
2018/0339416 A1 11/2018 Bormann et al.
2019/0002137 A1 1/2019 Pettersson
2019/0152182 A1 5/2019 Hedberg
2019/0184670 A1 6/2019 Davies et al.
2019/0308383 A1 10/2019 Provoost et al.
2019/0308761 A1 10/2019 Provoost et al.
2019/0329513 A1 10/2019 Pettersson
2019/0389611 A1 12/2019 Pettersson
2020/0009818 A1 1/2020 Walsh
2020/0031506 A1 1/2020 Ponti
2020/0101686 A1 4/2020 Fredander et al.
2020/0290303 A1 9/2020 Blomberg et al.
2020/0407087 A1 12/2020 Pettersson
2021/0001583 A1 1/2021 Osterhout
2021/0039347 A1* 2/2021 Pettersson ............. B65H 29/52

(56) References Cited

U.S. PATENT DOCUMENTS

| | | | |
|---|---|---|---|
| 2021/0261281 | A1 | 8/2021 | Engleman et al. |
| 2021/0370633 | A1 | 12/2021 | Provoost et al. |
| 2021/0371229 | A1 | 12/2021 | Osterhout |
| 2022/0153462 | A1 | 5/2022 | Provoost et al. |
| 2023/0142034 | A1 | 5/2023 | Engleman et al. |
| 2023/0302755 | A1 | 9/2023 | Blomberg et al. |
| 2023/0339203 | A1 | 10/2023 | Provoost et al. |
| 2023/0373182 | A1 | 11/2023 | Osterhout |

FOREIGN PATENT DOCUMENTS

| | | | |
|---|---|---|---|
| CN | 1275515 | A | 12/2000 |
| CN | 1366487 | A | 8/2002 |
| CN | 1386400 | A | 12/2002 |
| CN | 1449966 | A | 10/2003 |
| CN | 1494502 | A | 5/2004 |
| CN | 1876361 | A | 12/2006 |
| CN | 2925862 | Y | 7/2007 |
| CN | 101746076 | A | 6/2010 |
| CN | 201941185 | U | 8/2011 |
| CN | 201990294 | U | 9/2011 |
| CN | 102264532 | A | 11/2011 |
| CN | 102361809 | A | 2/2012 |
| CN | 102371705 | A | 3/2012 |
| CN | 102574654 | A | 7/2012 |
| CN | 202412794 | U | 9/2012 |
| CN | 102753442 | A | 10/2012 |
| CN | 102756943 | A | 10/2012 |
| CN | 202491466 | U | 10/2012 |
| CN | 102791581 | A | 11/2012 |
| CN | 103358586 | A | 10/2013 |
| CN | 103534069 | A | 1/2014 |
| CN | 104044166 | A | 9/2014 |
| CN | 104169073 | A | 11/2014 |
| CN | 104185538 | A | 12/2014 |
| CN | 104339709 | A | 2/2015 |
| CN | 102941592 | | 4/2015 |
| CN | 204263619 | U | 4/2015 |
| CN | 104812560 | A | 7/2015 |
| CN | 104890208 | A | 9/2015 |
| CN | 104985868 | A | 10/2015 |
| CN | 204773785 | U | 11/2015 |
| CN | 205112506 | U | 3/2016 |
| CN | 105459454 | A | 4/2016 |
| CN | 106003821 | A | 10/2016 |
| CN | 106003823 | A | 10/2016 |
| CN | 106079570 | A | 11/2016 |
| CN | 205674551 | U | 11/2016 |
| CN | 106926513 | A | 7/2017 |
| CN | 107206216 | A | 9/2017 |
| CN | 206579192 | U | 10/2017 |
| CN | 107614253 | A | 1/2018 |
| DE | 1082227 | | 5/1960 |
| DE | 1212854 | B | 3/1966 |
| DE | 2700004 | A1 | 7/1978 |
| DE | 2819000 | A1 | 11/1978 |
| DE | 3343523 | A1 | 6/1985 |
| DE | 3825506 | A1 | 2/1990 |
| DE | 19541061 | C1 | 11/1996 |
| DE | 19804667 | C1 | 9/1999 |
| DE | 10355544 | A1 | 6/2005 |
| DE | 60116464 | | 3/2006 |
| DE | 102005063193 | A1 | 7/2007 |
| DE | 102008035278 | A1 | 2/2010 |
| EP | 0030366 | A1 | 6/1981 |
| EP | 0234228 | A2 | 9/1987 |
| EP | 0359005 | A1 | 3/1990 |
| EP | 0650827 | A2 | 5/1995 |
| EP | 0889779 | A2 | 1/1999 |
| EP | 0903219 | A2 | 3/1999 |
| EP | 1065162 | A2 | 1/2001 |
| EP | 1223107 | A1 | 7/2002 |
| EP | 1373112 | A1 | 1/2004 |
| EP | 1428759 | A2 | 6/2004 |
| EP | 1997736 | A2 | 12/2008 |
| EP | 1497049 | B1 | 3/2010 |
| EP | 2228206 | A1 | 9/2010 |
| EP | 2377764 | A1 | 10/2011 |
| EP | 2384866 | A1 | 11/2011 |
| EP | 3231594 | A1 | 10/2017 |
| FR | 0428967 | A | 9/1911 |
| FR | 1020458 | A | 2/1953 |
| FR | 1592372 | A | 5/1970 |
| FR | 2280484 | A1 | 2/1976 |
| FR | 2411700 | A1 | 7/1979 |
| FR | 2626642 | A1 | 8/1989 |
| FR | 2721301 | A1 | 12/1995 |
| FR | 2770445 | A1 | 5/1999 |
| FR | 2808722 | A1 | 11/2001 |
| FR | 2814393 | A1 | 3/2002 |
| FR | 2976561 | A1 | 12/2012 |
| GB | 0166622 | | 7/1921 |
| GB | 0983946 | A | 2/1965 |
| GB | 1227785 | A | 4/1971 |
| GB | 1362060 | A | 7/1974 |
| GB | 1510888 | A | 5/1978 |
| GB | 1546789 | A | 5/1979 |
| JP | 49-099239 | A | 9/1974 |
| JP | 50-078616 | A | 6/1975 |
| JP | 51-006358 | Y1 | 2/1976 |
| JP | 51-027619 | A | 3/1976 |
| JP | 51-098591 | A | 8/1976 |
| JP | 55-057984 | A | 4/1980 |
| JP | 55-091652 | A | 7/1980 |
| JP | 56-089937 | A | 7/1981 |
| JP | 59-176836 | A | 10/1984 |
| JP | 59-198243 | A | 11/1984 |
| JP | 61-118720 | A | 6/1986 |
| JP | 62-172032 | | 10/1987 |
| JP | 01-133164 | A | 5/1989 |
| JP | 03-070927 | A | 3/1991 |
| JP | 3089399 | | 9/1991 |
| JP | 05-252889 | A | 10/1993 |
| JP | 06-123606 | A | 5/1994 |
| JP | 06-142585 | A | 5/1994 |
| JP | 07-156305 | A | 6/1995 |
| JP | 08-132388 | A | 5/1996 |
| JP | 08-238690 | A | 9/1996 |
| JP | 08-333036 | A | 12/1996 |
| JP | 09-506847 | A | 7/1997 |
| JP | 09-510548 | A | 10/1997 |
| JP | 11-320492 | A | 11/1999 |
| JP | 2000-025130 | A | 1/2000 |
| JP | 2000-323324 | A | 11/2000 |
| JP | 2003-079446 | A | 3/2003 |
| JP | 2003-112849 | A | 4/2003 |
| JP | 2003-165167 | A | 6/2003 |
| JP | 2003-194516 | A | 7/2003 |
| JP | 2004-330351 | A | 11/2004 |
| JP | 2005-067019 | A | 3/2005 |
| JP | 2005-219798 | A | 8/2005 |
| JP | 2006-289914 | A | 10/2006 |
| JP | 2007-331810 | A | 12/2007 |
| JP | 2008-254789 | A | 10/2008 |
| JP | 2009-023074 | | 2/2009 |
| JP | 2009-132049 | A | 6/2009 |
| JP | 2010-012628 | A | 1/2010 |
| JP | 2011-053284 | A | 3/2011 |
| JP | 2011-520674 | A | 7/2011 |
| JP | 2011-230385 | A | 11/2011 |
| JP | 2015-502273 | A | 1/2015 |
| JP | 2016-074133 | A | 5/2016 |
| JP | 2020-504038 | A | 2/2020 |
| JP | 2021-521067 | A | 8/2021 |
| JP | 2022-017471 | A | 1/2022 |
| KR | 10-1752372 | B1 | 6/2017 |
| RU | 2015030 | C1 | 6/1994 |
| RU | 2004136918 | A | 5/2006 |
| RU | 2334668 | C2 | 9/2008 |
| RU | 2345893 | C2 | 2/2009 |
| RU | 2398674 | C1 | 9/2010 |
| RU | 2014123534 | A | 12/2015 |
| RU | 2014123562 | A | 12/2015 |
| SE | 450829 | B | 8/1987 |

(56) References Cited

FOREIGN PATENT DOCUMENTS

| | | | | |
|---|---|---|---|---|
| SE | 515630 | C2 | 9/2001 | |
| SU | 40025 | A1 | 12/1934 | |
| SU | 213570 | A1 | 3/1968 | |
| SU | 992220 | A1 | 1/1983 | |
| SU | 1054863 | A1 | 11/1983 | |
| SU | 1121156 | A1 | 10/1984 | |
| SU | 1676825 | A1 | 9/1991 | |
| SU | 1718783 | A1 | 3/1992 | |
| SU | 1756211 | A1 | 8/1992 | |
| TW | 394741 | B | 6/2000 | |
| TW | 201406612 | A | 2/2014 | |
| WO | 95/24298 | A1 | 9/1995 | |
| WO | 96/10518 | A1 | 4/1996 | |
| WO | 96/14773 | A1 | 5/1996 | |
| WO | 97/31773 | A2 | 9/1997 | |
| WO | 99/17923 | A1 | 4/1999 | |
| WO | 00/21713 | A1 | 4/2000 | |
| WO | 01/04017 | A1 | 1/2001 | |
| WO | 01/85408 | A2 | 11/2001 | |
| WO | 02/79062 | A1 | 10/2002 | |
| WO | 03/89163 | A2 | 10/2003 | |
| WO | 03/97340 | | 11/2003 | |
| WO | 2009/093936 | A1 | 7/2009 | |
| WO | 2010/091043 | A1 | 8/2010 | |
| WO | 2011/007237 | A1 | 1/2011 | |
| WO | 2011/100078 | A2 | 8/2011 | |
| WO | 2011/135433 | A1 | 11/2011 | |
| WO | WO-2011135433 | A1 * | 11/2011 | ............ B65H 16/00 |
| WO | 2012/003167 | A1 | 1/2012 | |
| WO | 2013/071073 | A1 | 5/2013 | |
| WO | 2013/071080 | A1 | 5/2013 | |
| WO | 2013/106180 | A1 | 7/2013 | |
| WO | 2013/114057 | A2 | 8/2013 | |
| WO | 2014/048934 | A1 | 4/2014 | |
| WO | 2014/117816 | | 8/2014 | |
| WO | 2014/117817 | A1 | 8/2014 | |
| WO | 2014/188010 | A2 | 11/2014 | |
| WO | 2015/173671 | A1 | 11/2015 | |
| WO | 2015/173745 | A1 | 11/2015 | |
| WO | 2016/176271 | A1 | 11/2016 | |
| WO | 2017/203399 | A1 | 11/2017 | |
| WO | 2017/203401 | A1 | 11/2017 | |
| WO | 2017/218296 | A1 | 12/2017 | |
| WO | 2017/218297 | A1 | 12/2017 | |
| WO | 2019/246344 | A1 | 12/2019 | |

OTHER PUBLICATIONS

International Search Report and Written Opinion received for PCT Patent Application No. PCT/IB20/052315, mailed on Aug. 24, 2020, 20 pages.
Liang. et al., "A brief discussion on improving self-esteem Ways to improve packaging machine performance," Salt Industry and Chemical Industry, Issue 01, 2010, pp. 45-48.
Office Action received for U.S. Appl. No. 14/370,729, mailed on Jan. 26, 2017.
Office Action received for U.S. Appl. No. 14/970,224, mailed on May 30, 2018.
Office Action received for U.S. Appl. No. 15/872,770, mailed on Mar. 27, 2020.
Office Action received for U.S. Appl. No. 15/901,089, mailed on Apr. 13, 2020.
Office Action received for U.S. Appl. No. 16/109,261, mailed on Apr. 28, 2020.
Office Action received for U.S. Appl. No. 29/419,922, mailed on Aug. 6, 2013.
Office Action received for U.S. Appl. No. 13/805,602, mailed on Dec. 2, 2015.
Office Action received for U.S. Appl. No. 15/616,688, mailed on Mar. 19, 2020.
Definition of Against, per Merriam-Webster, retrieved on Oct. 4, 2022 from URL: https://www.merriam-webster.com/dictionary/against (Year: 2022).
Definition of Cam, per "Oxford Languages", retreived on Sep. 29, 2022 from (abridged) URL: https://tinyurl.com/17082294URL1 (Year: 2022).
Final Office Action received for U.S. Appl. No. 13/147,787, mailed on Apr. 17, 2015.
Final Office Action received for U.S. Appl. No. 13/147,787, mailed on Feb. 16, 2016.
Final Office Action received for U.S. Appl. No. 13/147,787, mailed on Mar. 7, 2017.
Final Office Action received for U.S. Appl. No. 14/357,183, mailed on Nov. 12, 2015.
Final Office Action received for U.S. Appl. No. 14/357,190, mailed on Aug. 1, 2017.
Final Office Action received for U.S. Appl. No. 14/370,729, mailed on Jul. 12, 2017.
Final Office Action received for U.S. Appl. No. 15/872,770, mailed on Sep. 16, 2020, 17 pages.
Final Office Action received for U.S. Appl. No. 16/619,818, mailed on Feb. 3, 2022, 10 pages.
Final Office Action received for U.S. Appl. No. 16/814,509, mailed on Sep. 19, 2022, 24 pages.
Final Office Action received for U.S. Appl. No. 17/023,088, mailed on Nov. 8, 2022, 20 pages.
Final Office Action received for U.S. Appl. No. 17/082,294, mailed on Jan. 20, 2023, 13 pages.
International Search Report and Written Opininon for application No. PCT/US2017/036606 mailed on Oct. 24, 2017.
International Search Report and Written Opinion for application No. PCT/US2012/070719 mailed on Feb. 25, 2013.
International Search Report and Written Opinion for application No. PCT/US2017/036603 mailed on Oct. 18, 2017.
International Search Report and Written Opinion for corresponding PCT Application No. PCT/IB2015/054179, Date of Mailing Aug. 28, 2015, 13 pages.
International Search Report and Written Opinion for PCT/US18/14275 dated Apr. 4, 2018.
International Search Report and Written Opinion for PCT/US19/62696 dated Feb. 4, 2020.
International Search Report and Written Opinion for PCT/US2015/67375 dated Mar. 11, 2016.
International Search Report and Written Opinion for PCT/US2018/020928 mailed Jun. 7, 2018.
International Search Report and Written Opinion for PCT/US2019/038142 dated Aug. 2, 2019.
International Search Report and Written Opinion for PCT/US2019/049102 mailed Dec. 2, 2019.
International Search Report and Written Opinion from International Application No. PCT/US2010/022983 dated Apr. 13, 2010.
International Search Report and Written Opinion issued in PCT/US2018/032311 mailed Sep. 20, 2018.
International Search Report and Written Opinion PCT/IB2019/052793 mailed Nov. 11, 2019.
International Search Report and Written Opinion PCT/IB2019/052794 mailed on Jun. 19, 2019.
International Search Report and Written Opinion received for PCT Patent Application No. PCT/US2019/049535, mailed on Jun. 9, 2020, 14 pages.
International Search Report and Written Opinion received for PCT Patent Application No. PCT/US2020/012519, mailed on Jun. 26, 2020, 19 pages.
International Search Report and Written Opinion, PCT/US2012/064403, US Search Authority, Completed Mar. 26, 2013, Mailed Apr. 8, 2013.
International Search Report and Written Opinion, PCT/US2012/064414, US Search Authority, Completed Jan. 4, 2013, dated Jan. 25, 2013.
International Search Report for PCT/US2011/042096 dated Oct. 28, 2011.
Non-Final Office Action received for U.S. Appl. No. 15/872,770, mailed on Nov. 10, 2020, 24 pages.
Non-Final Office Action received for U.S. Appl. No. 16/310,406, mailed on Aug. 19, 2020, 22 pages.

(56) References Cited

OTHER PUBLICATIONS

Non-Final Office Action received for U.S. Appl. No. 16/375,579, mailed on Feb. 18, 2021, 12 pages.
Non-Final Office Action received for U.S. Appl. No. 16/375,588, mailed on Jul. 2, 2021, 15 pages.
Non-Final Office Action received for U.S. Appl. No. 16/619,818, mailed on Aug. 31, 2021, 13 pages.
Non-Final Office Action received for U.S. Appl. No. 16/814,509, mailed on Dec. 5, 2022, 26 pages.
Non-Final Office Action received for U.S. Appl. No. 17/023,088, mailed on May 10, 2022, 11 pages.
Non-Final Office Action received for U.S. Appl. No. 17/082,294, mailed on Oct. 12, 2022, 12 pages.
Non-Final Office Action received for U.S. Appl. No. 17/252,722, mailed on Sep. 9, 2022, 13 pages.
Non-Final Office Action received for U.S. Appl. No. 17/587,836, mailed on Mar. 1, 2023, 14 pages.
Notice of Allowance received for U.S. Appl. No. 15/901,089, mailed on Jan. 31, 2022, 9 pages.
Office Action received for European Patent Application No. 16814509, mailed on Mar. 1, 2022, 21 pages.
Office Action received for U.S. Appl. No. 13/147,787, mailed on Aug. 27, 2014.
Office Action received for U.S. Appl. No. 13/147,787, mailed on Oct. 28, 2016.
Office Action received for U.S. Appl. No. 13/147,787, mailed on Sep. 30, 2015.
Office Action received for U.S. Appl. No. 14/357,183, mailed on Jul. 16, 2015.
Office Action received for U.S. Appl. No. 14/357,190, mailed on Feb. 17, 2017.
Office Action received for U.S. Appl. No. 14/370,729, mailed on Dec. 19, 2017.
Zhang., "Modern energy-saving technology in Application on plastic packaging machinery," Hunan packaging, 2011, pp. 45-50.

* cited by examiner

CONVERTING MACHINE

This application is a continuation of U.S. application Ser. No. 17/082,294, filed on Oct. 28, 2020, entitled "CONVERTING MACHINE", which is a divisional of U.S. application Ser. No. 15/901,089, filed Feb. 21, 2018, now U.S. Pat. No. 11,400,680 issued on Aug. 2, 2022, entitled "CONVERTING MACHINE", which is a continuation of U.S. application Ser. No. 14/357,190, filed May 8, 2014, Now U.S. Pat. No. 9,969,142 issued on May 15, 2018, entitled "CONVERTING MACHINE", which claims priority to and the benefit of PCT Application No. PCT/US2012/064403, filed Nov. 9, 2012, entitled "CONVERTING MACHINE", which claims the benefit of and priority to the following applications: U.S. Provisional Application No. 61/558,298, filed Nov. 10, 2011, entitled "ELEVATED CONVERTING MACHINE WITH OUTFEED GUIDE", U.S. Provisional Application No. 61/640,686, filed Apr. 30, 2012, entitled "CONVERTING MACHINE", and U.S. Provisional Application No. 61/643,267, filed May 5, 2012, entitled "CONVERTING MACHINE". The entire content of each of the foregoing are incorporated herein by reference.

BACKGROUND OF THE INVENTION

1. The Field of the Invention

Exemplary embodiments of the invention relate to systems, methods, and devices for converting sheet materials. More specifically, exemplary embodiments relate to a converting machine for converting paperboard, corrugated board, cardboard, and similar sheet materials into templates for boxes and other packaging.

2. The Relevant Technology

Shipping and packaging industries frequently use paperboard and other sheet material processing equipment that converts sheet materials into box templates. One advantage of such equipment is that a shipper may prepare boxes of required sizes as needed in lieu of keeping a stock of standard, pre-made boxes of various sizes. Consequently, the shipper can eliminate the need to forecast its requirements for particular box sizes as well as to store pre-made boxes of standard sizes. Instead, the shipper may store one or more bales of fanfold material, which can be used to generate a variety of box sizes based on the specific box size requirements at the time of each shipment. This allows the shipper to reduce storage space normally required for periodically used shipping supplies as well as reduce the waste and costs associated with the inherently inaccurate process of forecasting box size requirements, as the items shipped and their respective dimensions vary from time to time.

In addition to reducing the inefficiencies associated with storing pre-made boxes of numerous sizes, creating custom sized boxes also reduces packaging and shipping costs. In the fulfillment industry it is estimated that shipped items are typically packaged in boxes that are about 65% larger than the shipped items. Boxes that are too large for a particular item are more expensive than a box that is custom sized for the item due to the cost of the excess material used to make the larger box. When an item is packaged in an oversized box, filling material (e.g., Styrofoam, foam peanuts, paper, air pillows, etc.) is often placed in the box to prevent the item from moving inside the box and to prevent the box from caving in when pressure is applied (e.g., when boxes are taped closed or stacked). These filling materials further increase the cost associated with packing an item in an oversized box.

Customized sized boxes also reduce the shipping costs associated with shipping items compared to shipping the items in oversized boxes. A shipping vehicle filled with boxes that are 65% larger than the packaged items is much less cost efficient to operate than a shipping vehicle filled with boxes that are custom sized to fit the packaged items. In other words, a shipping vehicle filled with custom sized packages can carry a significantly larger number of packages, which can reduce the number of shipping vehicles required to ship the same number of items. Accordingly, in addition or as an alternative to calculating shipping prices based on the weight of a package, shipping prices are often affected by the size of the shipped package. Thus, reducing the size of an item's package can reduce the price of shipping the item. Even when shipping prices are not calculated based on the size of the packages (e.g., only on the weight of the packages), using custom sized packages can reduce the shipping costs because the smaller, custom sized packages will weigh less than oversized packages due to using less packaging and filling material.

Although sheet material processing machines and related equipment can potentially alleviate the inconveniences associated with stocking standard sized shipping supplies and reduce the amount of space required for storing such shipping supplies, previously available machines and associated equipment have various drawbacks. For instance, previously available machines have had a significant footprint and have occupied a lot of floor space. The floor space occupied by these large machines and equipment could be better used, for example, for storage of goods to be shipped. In addition to the large footprint, the size of the previously available machines and related equipment makes manufacturing, transportation, installation, maintenance, repair, and replacement thereof time consuming and expensive. For example, some of the existing machines and related equipment have a length of about 22 feet and a height of 12 feet.

In addition to their size, previous converting machines have been quite complex and have required access to sources of high power and compressed air. More specifically, previous converting machines have included both electrically powered components as well as pneumatic components. Including both electric and pneumatic components increases the complexity of the machines and requires the machines to have access to both electrical power and compressed air, as well as increases the size of the machines.

Accordingly, it would be advantageous to have a relatively small and simple converting machine to conserve floor space, reduce electrical power consumption, eliminate the need for access to compressed air, and reduce maintenance costs and downtime associated with repair and/or replacement of the machine.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The embodiments described herein generally relate to systems, methods, and devices for processing sheet materials and converting the same into packaging templates. More specifically, the described embodiments relate to a compact converting machine for converting sheet materials (e.g., paperboard, corrugated board, cardboard) into templates for boxes and other packaging.

While the present disclosure will be described in detail with reference to specific configurations, the descriptions are illustrative and are not to be construed as limiting the scope of the present invention. Various modifications can be made to the illustrated configurations without departing from the spirit and scope of the invention as defined by the claims. For better understanding, like components have been designated by like reference numbers throughout the various accompanying figures.

As used herein, the term "bale" shall refer to a stock of sheet material that is generally rigid in at least one direction, and may be used to make a packaging template. For example, the bale may be formed of continuous sheet of material or a sheet of material of any specific length, such as corrugated cardboard and paperboard sheet materials. Additionally, the bale may have stock material that is substantially flat, folded, or wound onto a bobbin.

As used herein, the term "packaging template" shall refer to a substantially flat stock of material that can be folded into a box-like shape. A packaging template may have notches, cutouts, divides, and/or creases that allow the packaging template to be bent and/or folded into a box. Additionally, a packaging template may be made of any suitable material, generally known to those skilled in the art. For example, cardboard or corrugated paperboard may be used as the template material. A suitable material also may have any thickness and weight that would permit it to be bent and/or folded into a box-like shape.

As used herein, the term "crease" shall refer to a line along which the template may be folded. For example, a crease may be an indentation in the template material, which may aid in folding portions of the template separated by the crease, with respect to one another. A suitable indentation may be created by applying sufficient pressure to reduce the thickness of the material in the desired location and/or by removing some of the material along the desired location, such as by scoring.

The terms "notch," "cutout," and "cut" are used interchangeably herein and shall refer to a shape created by removing material from the template or by separating portions of the template, such that a cut through the template is created.

Figure 1:
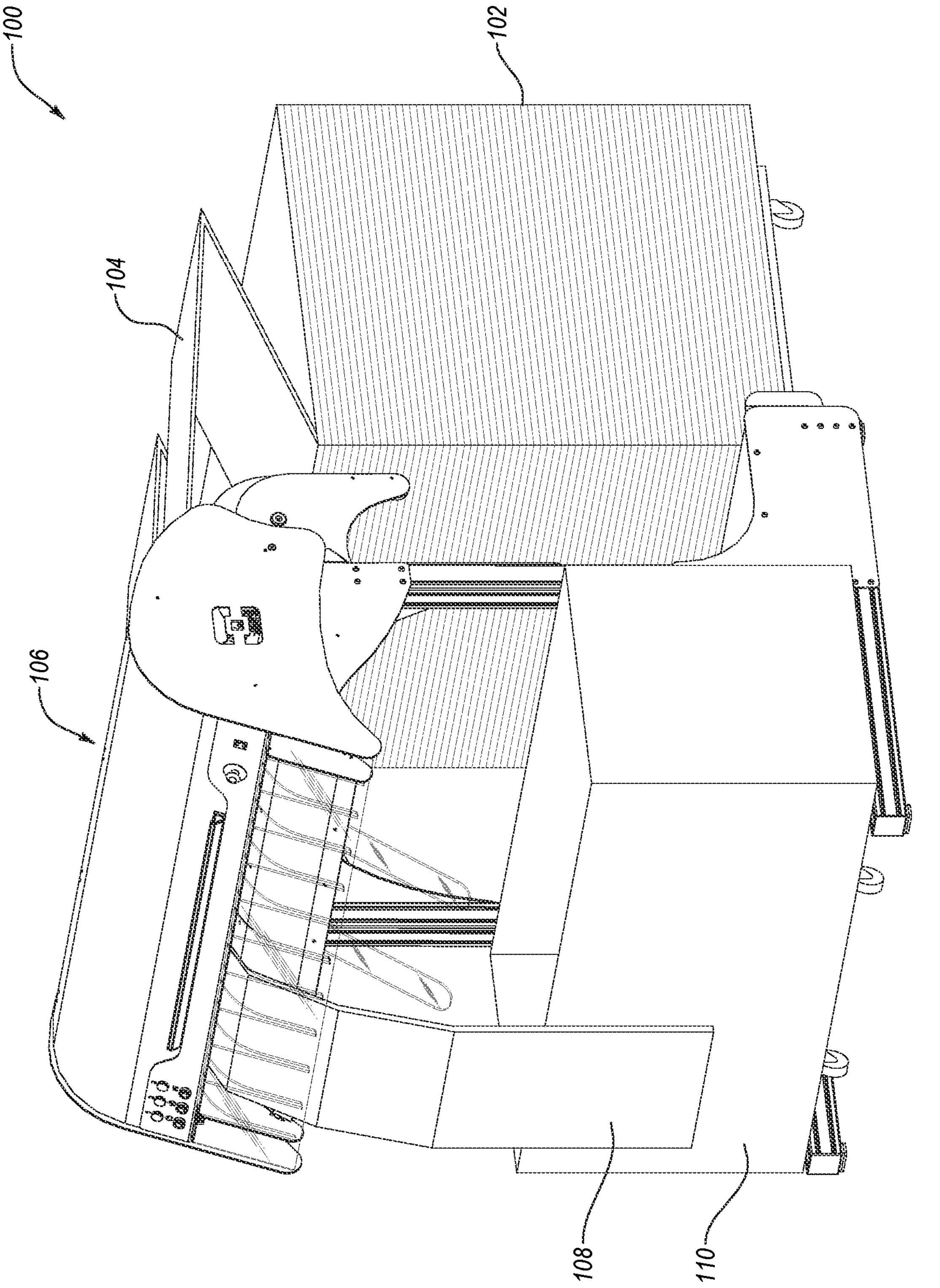
FIG. 1 illustrates a perspective view of an exemplary embodiment of a system for creating packaging templates.

FIG. 1 illustrates a perspective view of a system 100 that may be used to create packaging templates. System 100 includes one or more bales 102 of sheet material 104. System 100 also includes a converting machine 106 that performs one or more conversion functions on sheet material 104, as described in further detail below, in order to create packaging templates 108. Excess or waste sheet material 104 produced during the conversion process may be collected in a collection bin 110. After being produced, packaging templates 108 may be formed into packaging containers, such as boxes.

Figure 2:
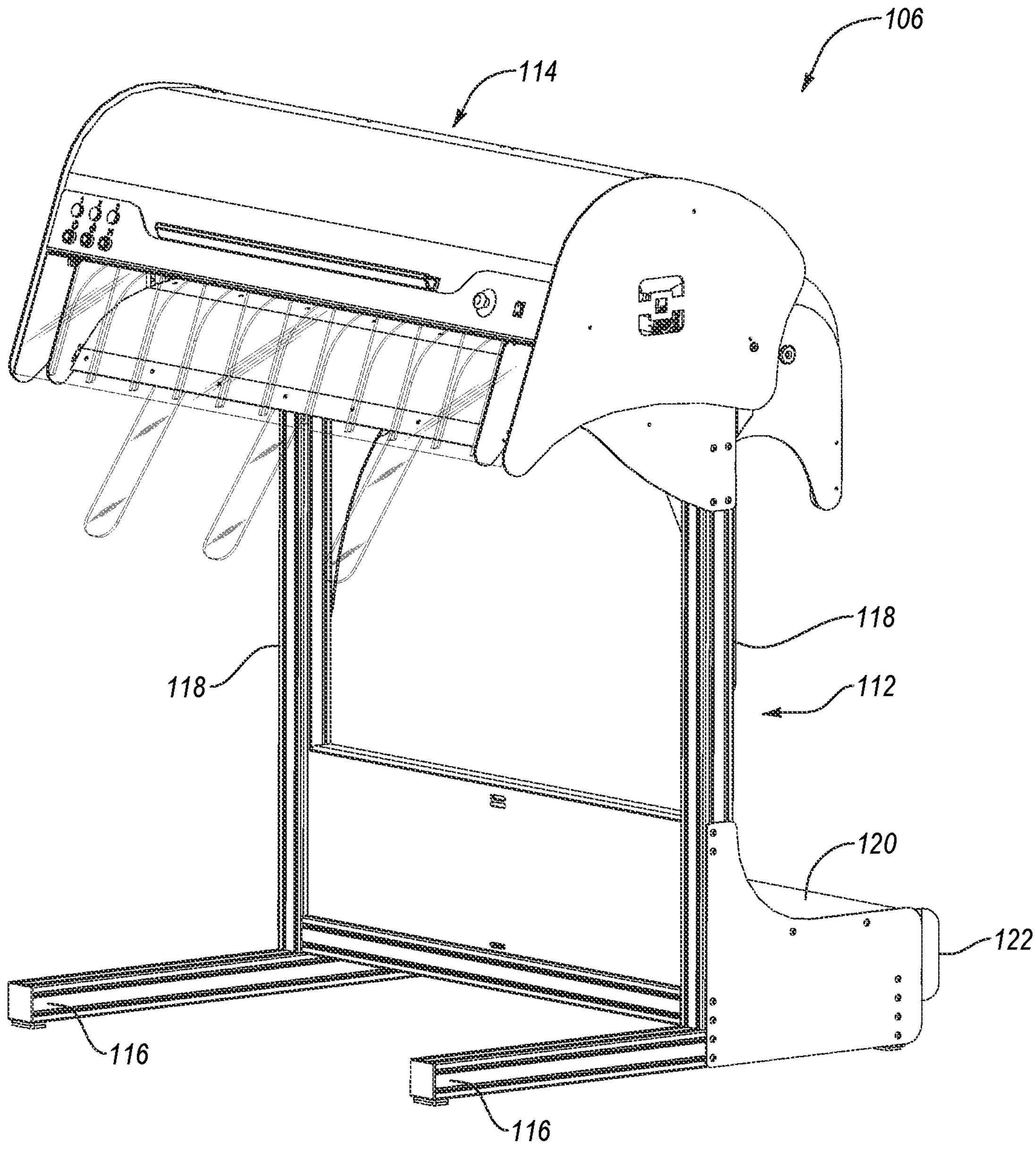
FIG. 2 illustrates a front perspective view of the converting machine from the system illustrated in FIG. 1.
Figure 3:
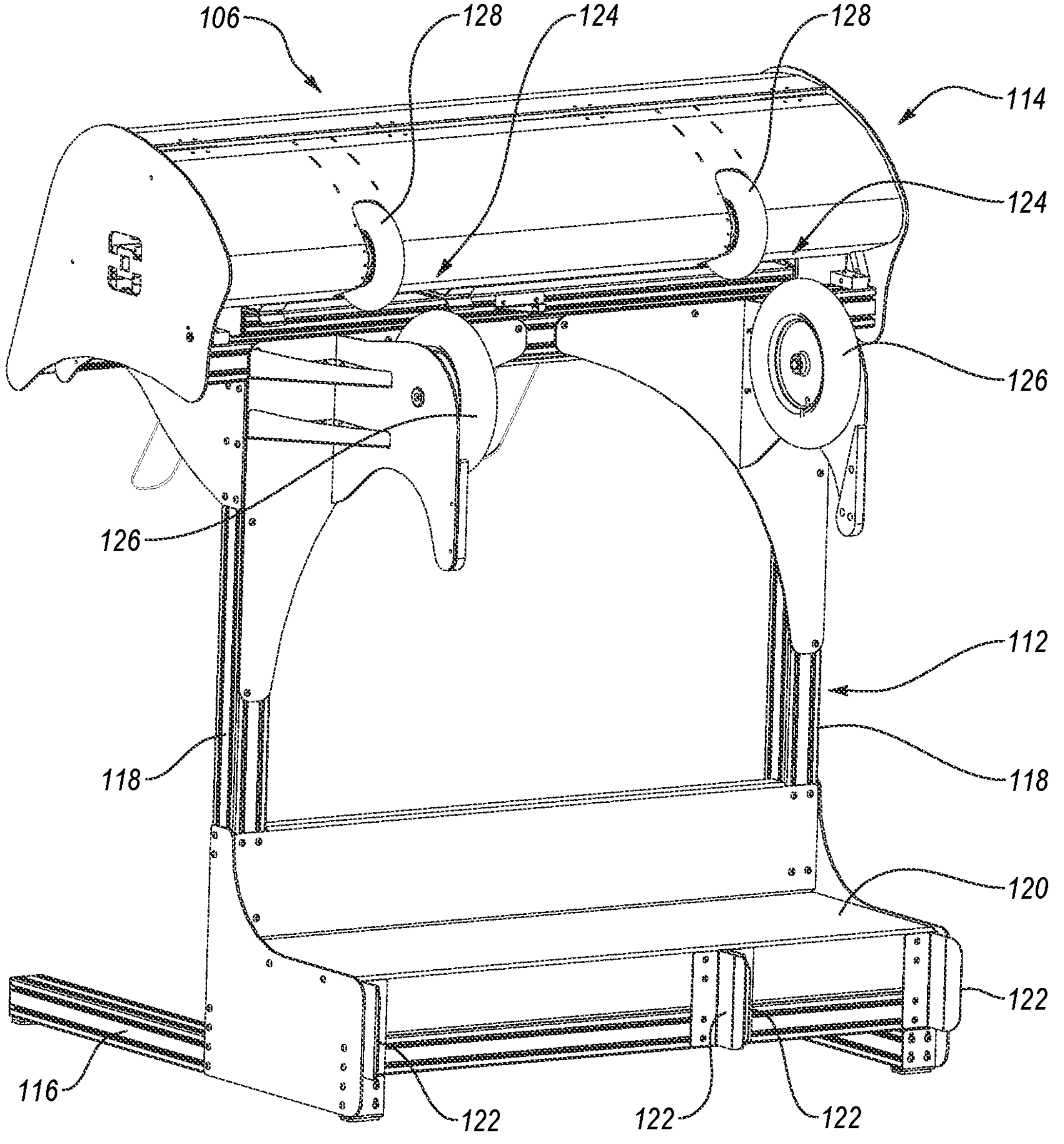
FIG. 3 illustrates a rear perspective view of the converting machine from the system illustrated in FIG. 1.
Figure 4:
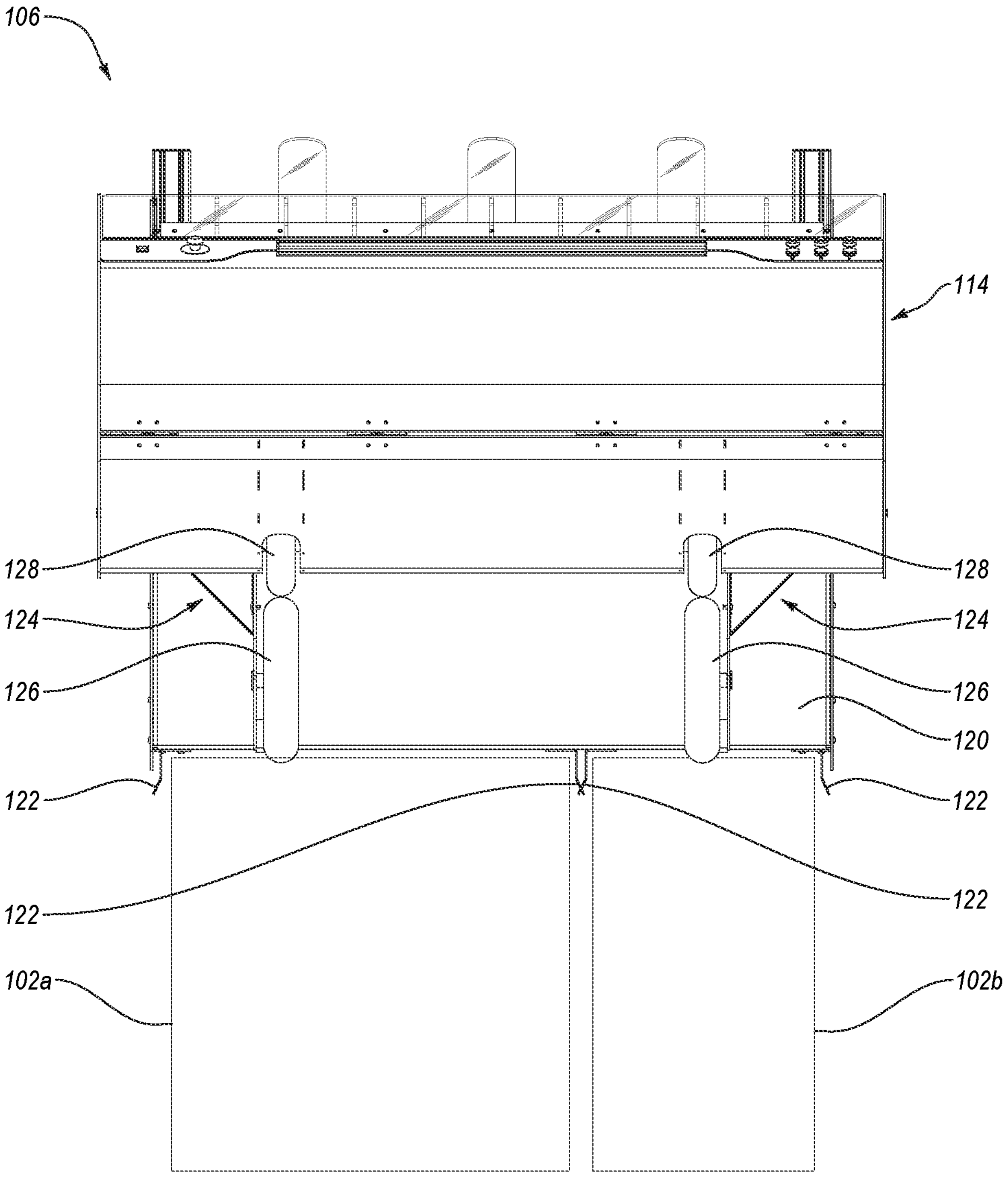
FIG. 4 illustrates a top view of the converting machine and fanfold bales from the system illustrated in FIG. 1.

With continued reference to FIG. 1, attention is also directed to FIGS. 2-4, which generally illustrate various aspects of converting machine 106 is greater detail. As illustrated in FIG. 2, converting machine 106 includes a support structure 112 and a converting assembly 114 mounted on support structure 112. Support structure 112 includes base members 116 that rest upon a support surface, such as a floor. Extending generally upwardly from base members 116 are supports 118. Supports 118 may be integrally formed with or coupled to base members 116. Converting assembly 114 is mounted on or coupled to supports 118.

As can be seen, converting assembly 114 is elevated above and spaced apart from a support surface when converting assembly 114 is mounted on supports 118. For instance, as shown in FIG. 1, converting assembly 114 may be elevated above the height of bale 102. Additionally, or alternatively, converting assembly 114 may be elevated to a height that would allow relatively long packaging templates 108 to hang therefrom without hitting the support surface below. Since converting assembly 114 is elevated, a platform 120 may optionally be connected to support structure 112 so that an operator may stand thereon when loading sheet material 104 into or servicing converting assembly 114.

As shown in FIGS. 3 and 4, connected to and extending from support structure 112 and/or platform 120 are bale guides 122. Bale guides 122 are generally vertically oriented and spaced apart from one another along the width of converting machine 106. Bale guides 122 may facilitate proper alignment of bales 102 with converting machine 106.

In the illustrated embodiment, for instance, converting machine 106 is designed to receive sheet material 104 from two bales 102*a*, 102*b*. Each of bales 102*a*, 102*b* may be positioned between adjacent bale guides 122 in order to properly align bales 102*a*, 102*b* with converting assembly 114. To assist with positioning of bales 102*a*, 102*b* between adjacent bales guides 122, bale guides 122 may be angled or may include flared portions that act to funnel bales 102 into the proper positions relative to converting assembly 114.

In some embodiments, bale guides 122 may be movably or slidably connected to structure 112 and/or platform 120, such that one or more of bale guides 122 may be moved along the width of converting machine 106 to increase or decrease the distance between adjacent bale guides 122. The movability of guides 122 may accommodate bales 102 of different widths.

As shown in FIGS. 1 and 4, bales 102 may be disposed proximate to the backside of converting machine 106, and sheet material 104 may be fed into converting assembly 114. Sheet material 104 may be arranged in bales 102 in multiple stacked layers. The layers of sheet material 104 in each bale 102 may have generally equal lengths and widths and may be folded one on top of the other in alternating directions. In other embodiments, sheet material 104 may be a rolled-up single-facer corrugate or similar semi-rigid paper or plastic products, or other forms and materials.

As best seen in FIGS. 3 and 4, converting machine 106 may also have one or more infeed guides 124. Each infeed guide 124 may include a lower infeed wheel 126 and an upper infeed wheel 128. In the illustrated embodiment, lower infeed wheels 126 are connected to support structure 112 and upper infeed wheels 128 are connected to converting assembly 114. In some embodiments, lower infeed wheels 126 or upper infeed wheels 128 may be omitted.

Each set of lower and upper infeed wheels 126, 128 are designed and arranged to guide sheet material 104 into converting assembly 114 while creating few if any bends, folds, or creases in sheet material 104. More specifically, lower infeed wheels 126 are positioned such that the axes of rotation of lower infeed wheels 126 are both vertically and horizontally offset from the axes of rotation of upper infeed wheels 128. As shown, the axes of rotation of lower infeed wheels 126 are positioned vertically lower than the axes of rotation of upper infeed wheels 128. Additionally, the axes of rotation of lower infeed wheels 126 are positioned horizontally further away from converting assembly 114 than the axes of rotation of upper infeed wheels 128. Nevertheless, lower and upper infeed wheels 126, 128 may intersect a common horizontal plane and/or a common vertical plane. In any case, lower and upper infeed wheels 126, 128 are positioned relative to one another such that sheet material 104 may be fed therebetween and into converting assembly 114.

Lower and upper infeed wheels 126, 128 may rotate to facilitate smooth movement of sheet material 104 into converting assembly 114. Additionally, lower infeed wheels 126 and/or upper infeed wheels 128 may be at least somewhat deformable so as to limit or prevent the formation of bends, folds, or creases in sheet material 104 as it is fed into converting assembly 114. That is, lower infeed wheels 126 and/or upper infeed wheels 128 may be able to at least partially deform as sheet material 104 is fed therebetween. When lower infeed wheels 126 and/or upper infeed wheels 128 partially deform, lower infeed wheels 126 and/or upper infeed wheels 128 may more closely conform to the shape of sheet material 104. For instance, when sheet material 104 is being fed into converting assembly 114, sheet material 104 may be pulled around infeed wheels 126, 128 (e.g., over lower infeed wheels 126 or under upper infeed wheels 126). If infeed wheels 126, 128 were not at least partially deformable, sheet material 104 may be bent or folded as it is pulled around infeed wheels. However, when infeed wheels 126, 128 are at least partially deformable, infeed wheels 126, 128 may deform so that the area of infeed wheels 126, 128 that contacts sheet material 104 is flatter than the normal radius of infeed wheels 126, 128. As a result, less folds or creases will be formed in sheet material 104 as it is fed into converting machine 114.

Lower infeed wheels 126 and/or upper infeed wheels 128 may include an outer surface formed of a deformable and/or elastic material (e.g., foam, rubber) or may include a low-pressure tube/tire thereabout. The deformable/elastic material or low-pressure tubes/tires may deform and/or absorb the forces applied to sheet material 104 in order to prevent or limit the formation of folds, bends, or creases in sheet material 104 during the feeding process. Additionally, the deformable/elastic material or low-pressure tubes/tires may also limit noises associated with feeding sheet material 104 into converting assembly 114.

As sheet material 104 is fed through converting assembly 114, converting assembly 114 may perform one or more conversion functions (e.g., crease, bend, fold, perforate, cut, score) on sheet material 104 in order to create packaging templates 108. Converting assembly 114 may include therein a converting cartridge 130 that feeds sheet material 104 through converting assembly 114 and performs the conversion functions thereon.

FIGS. 5-13 illustrate converting cartridge 130 separate from the rest of converting assembly 114 and converting machine 106. Converting cartridge 130 may be formed as a unit such that converting cartridge 130 may be selectively removed from converting assembly 114 as a single unit, such as for servicing or replacement. For instance, converting cartridge 130 may include a frame upon which the various components of converting cartridge 130 are assembled or to which they are connected. The converting cartridge frame may be connected to support structure 112 so that the converting cartridge frame does not bend or become twisted, which could adversely impact the performance of the components of converting cartridge 130.

More specifically, the converting cartridge frame may be connected to support structure 112 at three connection points. By using three connection points, rather than four or more, the converting cartridge frame is less likely to bend during assembly or use. Optionally, each of the connection points may be flexible connections to allow converting cartridge frame to move slightly or "float" relative to support structure 112. The flexible connections may be achieved using resilient materials (e.g., rubber washers) at the connection sites, for example. Additionally, the three connection points may be arranged so that two of the connection points control the longitudinal movement of the converting cartridge frame, but not the transverse movement of the converting cartridge frame. The third connection point may control the transverse movement of the converting cartridge frame, but not the longitudinal movement of the converting cartridge frame. In this way, converting cartridge 130 may remain straight and the functional aspects of converting cartridge 130 will not be adversely affected due to misalignment or other results of bending or twisting of the converting cartridge frame.

Figure 5:
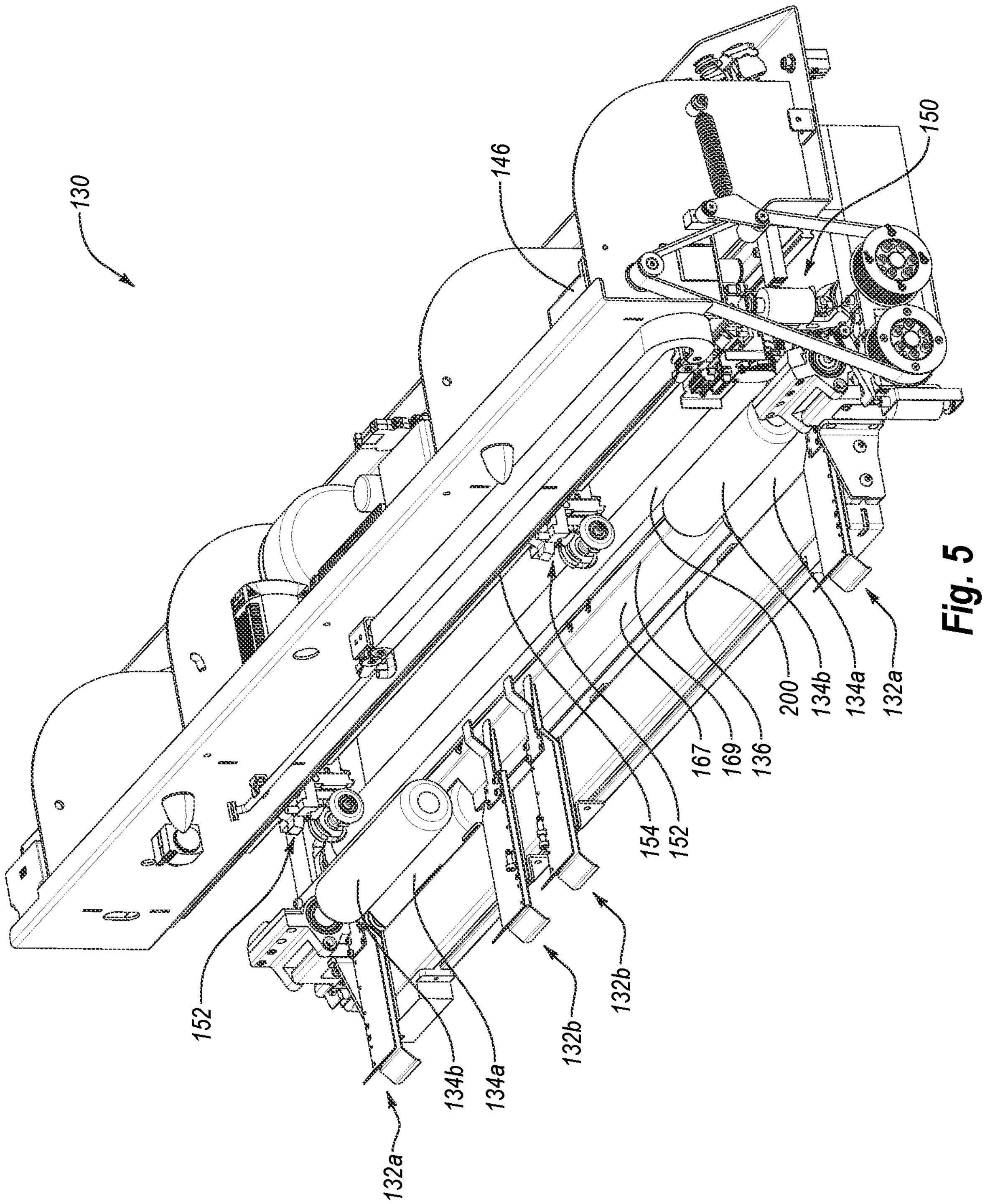
FIG. 5 is a perspective view of a converting cartridge from the converting machine of FIGS. 2-4.

As can be seen in FIG. 5, converting cartridge 130 may include one or more guide channels 132. Guide channels 132 may be configured to flatten sheet material 104 so as to feed a substantially flat sheet thereof through converting assembly 114. As shown, for instance, each guide channel 132 includes opposing upper and lower guide plates that are spaced apart sufficiently to allow sheet material 104 to pass therebetween, but also sufficiently close enough together to flatten sheet material 104. In some embodiments, as shown in FIG. 5, the upper and lower guide plates may be flared or spaced further apart at on opening end to facilitate insertion of sheet material 104 therebetween.

Some of guide channels 132 may be held or secured in a fixed position along the width of converting cartridge 130 while other guide channels 132 are able to move along at least a portion of the width of converting cartridge 130. In the illustrated embodiment, converting cartridge 130 includes movable guide channels 132*a* and fixed guide channels 132*b*. More specifically, fixed guide channels 132*b* may be secured in place between the opposing sides of converting cartridge 130. Movable guide channels 132*a* are disposed between left and right sides of converting cartridge 130 and fixed guide channels 132*b* such that movable guide channels 132*a* are able to move back and forth between the left and right sides of converting cartridge 130 and fixed guide channels 132*b*.

Movable guide channels 132*a* may be able to move so that guide channels 132*a*, 132*b* are able to accommodate sheet materials 104 of different widths. For instance, movable guide channels 132*a* may be able to move closer to fixed guide channels 132*b* when a narrower sheet material 104 is being converted than when a wider sheet material 104 is being converted. When a wider sheet material 104 is being converted, movable guide channels 132*a* may be moved away from fixed guide channels 132*b* so that the wider sheet material 104 may be passed between guide channels 132*a*, 132*b*. Movable guide channels 132*a* may be biased toward fixed guide channels 132*b* so that, regardless of how wide sheet material 104 is, movable and fixed guide channels 132*ab*, 132*b* will be properly spaced apart to guide sheet material 104 straight through converting assembly 114. Movable guide channels 132*a* may be biased toward fixed guide channels 132*b* with a spring or other resilient mechanism.

Fixed guide channels 132*b* may act as "zero" or reference points for the positioning of converting tools, which will be discussed in greater detail below. More specifically, the converting tools may reference the positions of fixed guide channels 132*b* to determine the location of sheet material 104 or an edge thereof. When the converting tools have been properly positioned using fixed guide channels 132*b* as zero points, the converting tools can perform the desired conversion functions at the proper locations on sheet material 104. In addition to providing a zero or reference point to the converting tools, the location of fixed guide channels 132*b* and/or the relative distance between guide channels 132*a*, 132*b* can also indicate to a control system the width of the sheet material 104 that is being used. Furthermore, allowing movable guide channel 132*a* to move relative to fixed guide channel 132*b* allows for small deviations in the width of sheet material 104.

In the illustrated embodiment, converting cartridge 130 includes two sets of guide channels 132 (e.g., movable guide channel 132*a* and fixed guide channel 132*b*) that guide lengths of sheet material 104 through converting assembly 114. It will be understood, however, that converting cartridge 130 may include one or multiple sets of guide channels for feeding one or multiple, side-by-side lengths of sheet material 104 (e.g., from multiple bales 102) through converting assembly 114. For instance, the illustrated guide channels 132*a*, 132*b* form a first (or left) track for feeding a first length of sheet material 104 from bale 102*a* (FIG. 4) through converting assembly 114 and a second (or right) track for feeding a second length of sheet material 104 from bale 102*b* through converting assembly 114.

As also illustrated in FIG. 5, converting cartridge 130 also includes one or more sets of feed rollers 134 that pull sheet material 104 into converting assembly 114 and advance sheet material 104 therethrough. Each track formed by sets of guide channels 132 may include its own set of feed rollers 134. Feed rollers 134 may be configured to pull sheet material 104 with limited or no slip and may be smooth, textured, dimpled, and/or teethed.

Feed rollers 134 may be positioned, angled, shaped (e.g., tapered), or adjusted so as to apply at least a slight side force on sheet material 104. The side force applied to sheet material 104 by feed rollers 134 may be generally in the direction of fixed guide channel 132*b*. As a result, sheet material 104 will be at least slightly pushed toward/against fixed guide channel 132*b* as sheet material 104 is advanced through converting assembly 114. One benefit of at least slightly pushing sheet material 104 toward/against fixed guide channel 132*b* is that the biasing force required to bias movable guide channel 132*a* toward fixed guide channel 132*b* (e.g., the zero point for the converting tools) is reduced.

In the illustrated embodiment, each set of feed rollers 134 includes an active roller 134*a* and a pressure roller 134*b*. As discussed below, active rollers 134*a* may be actively rolled by an actuator or motor in order to advance sheet material 104 through converting assembly 114. Although pressure rollers 134*b* are not typically actively rolled by an actuator, pressure rollers 134*b* may nevertheless roll to assist with the advancement of sheet material 104 through converting assembly 114.

Active rollers 134*a* are secured to converting cartridge 130 such that active rollers 134*a* are maintained in generally the same position. More specifically, active rollers 134*a* are mounted on shaft 136. In contrast, pressure rollers 134*b* are able to be moved closer to and further away from active rollers 134*a*. When pressure rollers 134*b* are moved toward active rollers 134*a*, feed rollers 134*a*, 134*b* cooperate to advance sheet material 104 through converting assembly 114. In contrast, when pressure rollers 134*b* are moved away from active rollers 134*a*, sheet material 104 is not advanced through converting assembly 114. That is, when pressure rollers 134*b* are moved away from active rollers 134*a*, there is insufficient pressure applied to sheet material 104 to advance sheet material 104 through converting assembly 114.

Figure 6A:
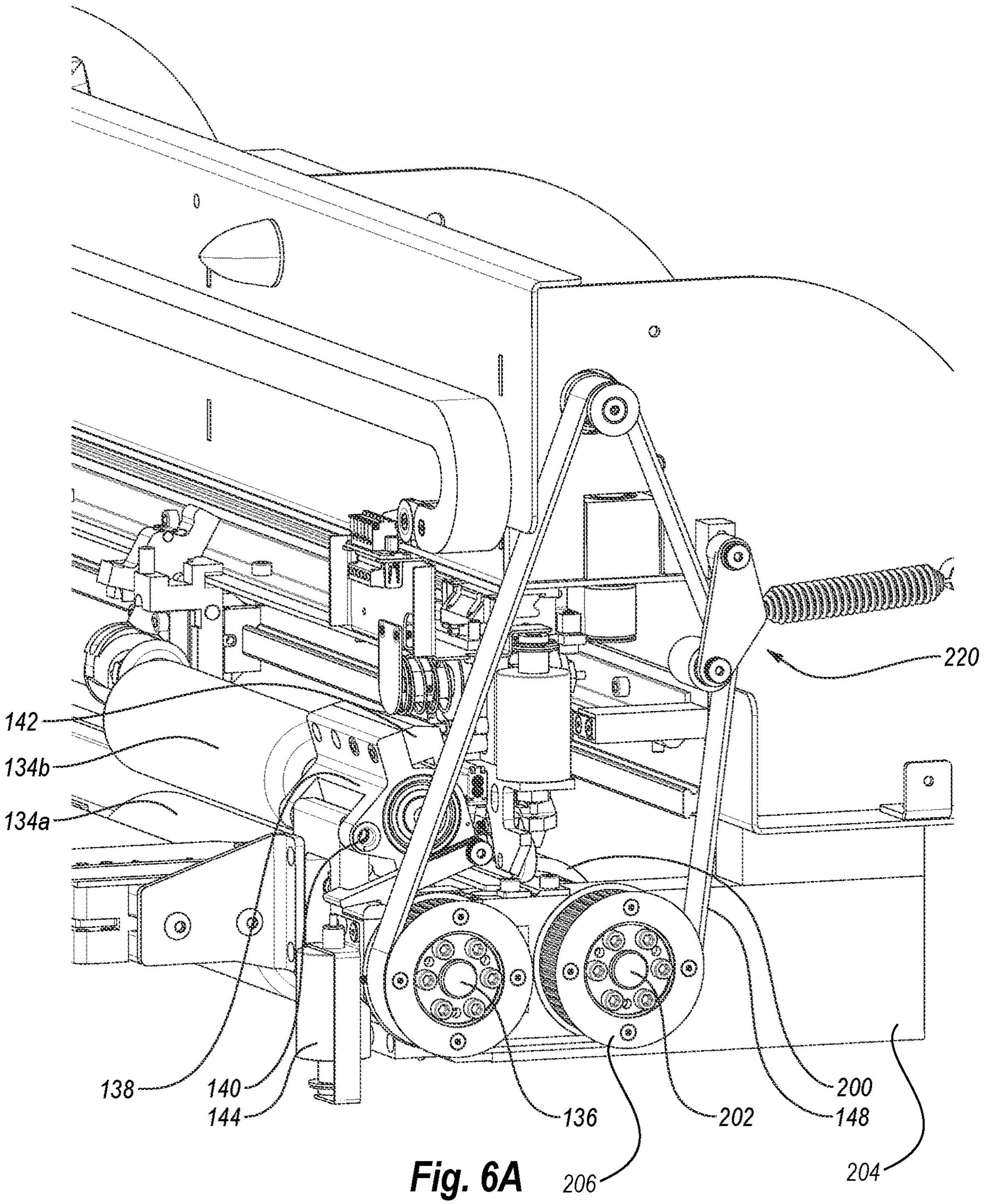
FIG. 6A is a perspective views of feed rollers of the converting cartridge of FIG. 5, which selectively advance sheet material through the converting machine of FIGS. 2-4.
Figure 6B:
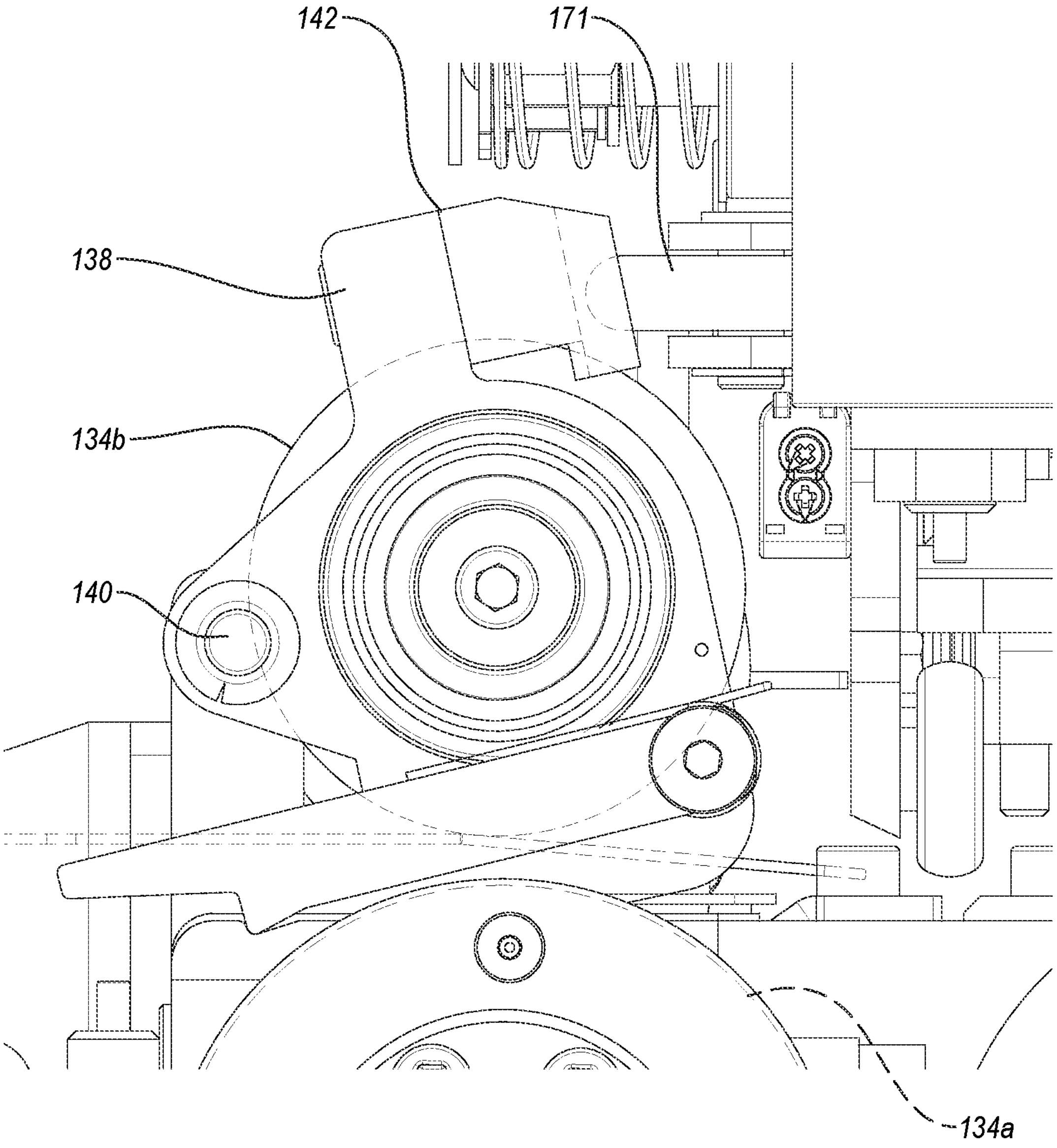
FIG. 6B is an end view of the feed rollers of FIG. 6A, with a pressure feed roller in an activated position.
Figure 6C:
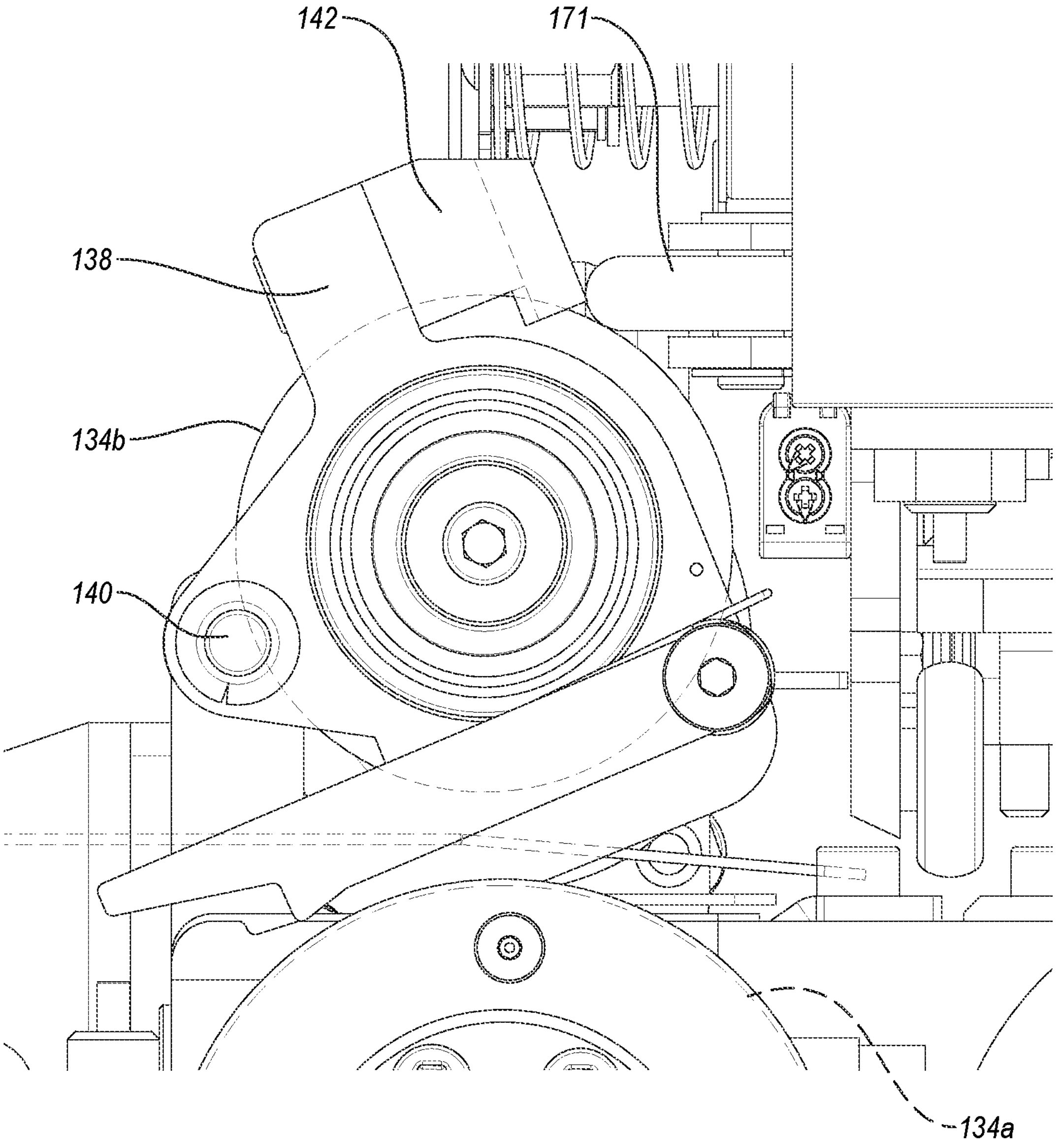
FIG. 6C is an end view of the feed rollers of FIG. 6A, with the pressure feed roller in a deactivated position.

FIGS. 6A-6C illustrate one set of feed rollers 134 and a mechanism for moving pressure roller 134*b* closer to and further away from active roller 134*a*. As shown, pressure roller 134*b* is rotatably secured to pressure roller block 138, which is pivotally connected to converting cartridge 130 via hinge 140. When pressure roller block 138 is pivoted about hinge 140, pressure roller 134*b* is moved toward (FIG. 6B) or away from (FIG. 6C) active roller 134*a*. When pressure roller 134*b* is moved toward active roller 134*a*, pressure roller 134*b* is activated or in an activated position. When pressure roller 134*b* is moved away from active roller 134*a*, pressure roller 134*b* is deactivated or in a deactivated position.

Pressure roller 134*b* may be selectively moved from the activated position to the deactivated position by engaging a pressure roller cam 142 on pressure roller block 138. The engagement of pressure roller cam 142 will be discussed in greater detail below. Briefly, however, when sheet material 104 is not to be advanced through converting assembly 114, pressure roller cam 142 may be engaged to cause pressure roller block 138 and pressure roller 134*b* to pivot about hinge 140 so that pressure roller 134*b* is moved to the deactivated position, as shown in FIG. 6C. Similarly, when sheet material 104 is to be advanced through converting assembly 114, pressure roller cam 142 may be disengaged. Disengagement of pressure roller cam 142 allows pressure roller block 138 and pressure roller 134*b* to pivot about hinge 140 so that pressure roller 134*b* is moved to the activated position, as shown in FIG. 6B.

Pressure roller 134*b* may be biased toward either the activated position or the deactivated position. For instance, pressure roller 134*b* may be biased toward the activated position so that pressure roller 134*b* remains in the activated position unless actively moved to the deactivated position (e.g., by engagement of pressure roller cam 142). Alternatively, pressure roller 134*b* may be biased toward the deactivated position so that pressure roller 134*b* remains in the deactivated position unless actively moved to the activated position.

In the illustrated embodiment, once pressure roller 134*b* has been moved to the deactivated position, pressure roller 134*b* may be selectively held in the deactivated position. For instance, when pressure roller 134*b* is moved to the deactivated position, a locking mechanism 144 may hold pressure roller 134*b* in the deactivated position until it is desired to move pressure roller 134*b* to the activated position. By way of example, locking mechanism 144 may be an electromagnet that holds pressure roller block 138 and pressure roller 134*b* in the deactivated position. When it is desired to move pressure roller 134*b* to the activated position, locking mechanism 144 may be released, such as by deactivating its magnetic force. The magnetic force may be deactivated by turning off the electromagnetic field of the electromagnet. Rather than using an electromagnet, a permanent magnet may be used to hold pressure roller block 138 and pressure roller 134*b* in the deactivated position. When it is desired to move pressure roller 134*b* to the activated position, the magnetic force of the permanent magnet may be deactivated by applying an electric field around the magnet that counteracts the magnet's magnetic field. Alternatively, locking mechanism 144 may be a mechanical mechanism, solenoid, or other device than can selectively hold pressure roller 134*b* in the deactivated position. Locking mechanism 144 enables pressure roller 134*b* to be held in the deactivated position without require the continuous engagement of pressure roller cam 142.

When it is desired to advance sheet material 104 through converting assembly 114, pressure roller 134*b* may be moved to the activated position as described above. One or both of feed rollers 134 may be actively rotated to advance sheet material 104. For instance, in the illustrated embodiment, shaft 136 (on which active roller 134*a* is mounted) is connected to a stepper motor 146 (FIG. 5) via belt 148. Stepper motor 146 may rotate belt 148, which causes shaft 136 and active roller 134*a* to rotate. When pressure roller 134*b* is in the activated position, pressure roller 134*b* presses sheet material 104 against active roller 134*a*, which causes sheet material 104 to advance through converting assembly 114. In contrast, when pressure roller 134*b* is in the deactivated position, pressure roller 134*b* does not press sheet material 104 against active roller 134*a*. Without pressure roller 134*b* pressing sheet material 104 against active roller 134*a*, active roller 134*a* may rotate/spin underneath sheet material 104 without advancing sheet material 104 through converting assembly 114.

Returning attention to FIG. 5, it can be seen that converting cartridge 130 includes one or more converting tools, such as a crosshead 150 and longheads 152, that perform the conversion functions (e.g., crease, bend, fold, perforate, cut, score) on sheet material 104 in order to create packaging templates 108. Some of the conversion functions may be made on sheet material 104 in a direction substantially perpendicular to the direction of movement and/or the length of sheet material 104. In other words, some conversion functions may be made across (e.g., between the sides) sheet material 104. Such conversions may be considered "transverse conversions."

To perform the transverse conversions, crosshead 150 may move along at least a portion of the width of converting cartridge 130 in a direction generally perpendicular to the direction in which sheet material 104 is fed through converting assembly 114 and/or the length of sheet material 104. In other words, crosshead 150 may move across sheet material 104 in order to perform transverse conversions on sheet material 104. Crosshead 150 may be movably mounted on a track 154 to allow crosshead 150 to move along at least a portion of the width of converting cartridge 130.

Figure 7A:
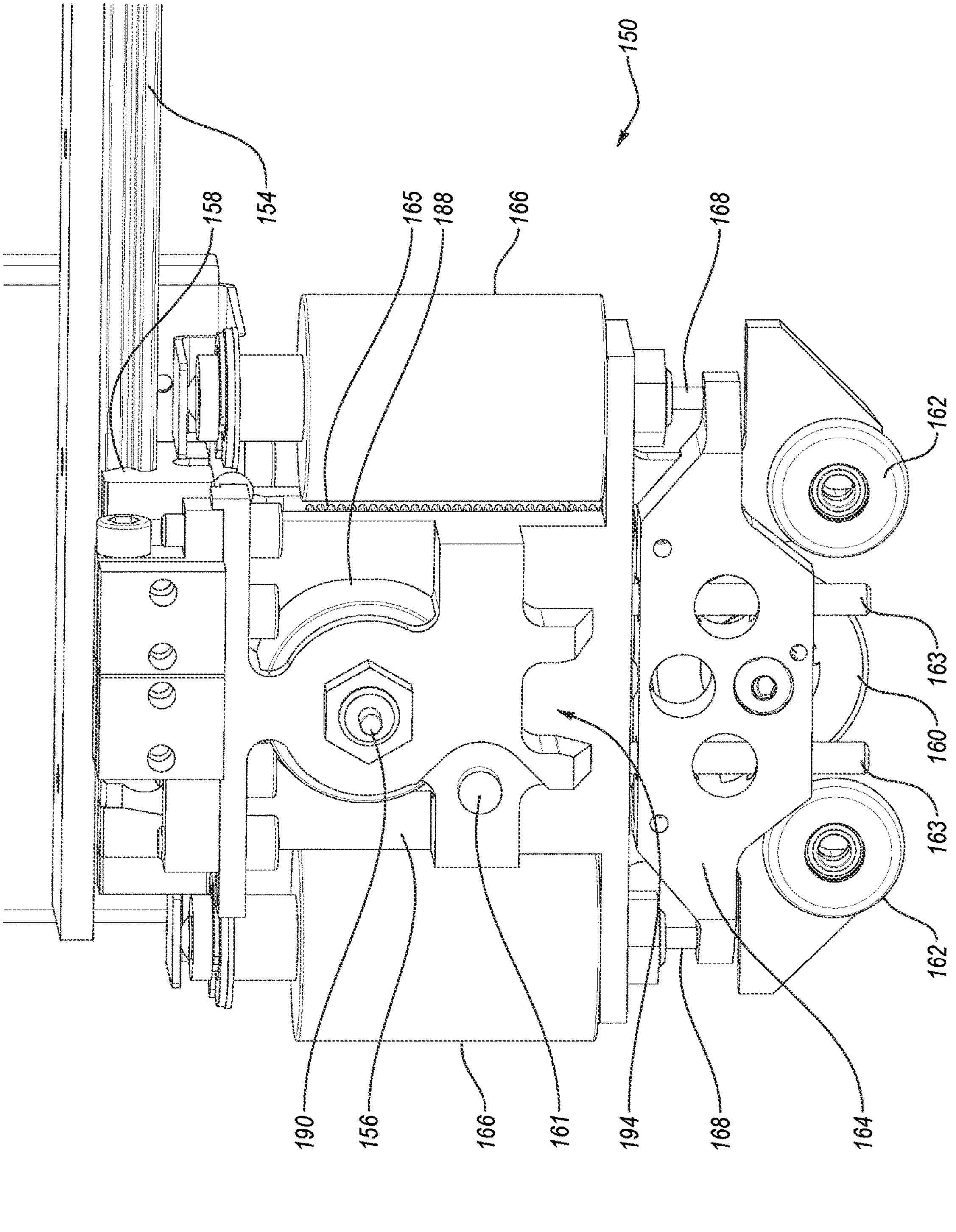
FIG. 7A is a perspective view of a crosshead converting tool of the converting cartridge of FIG. 5, with a cutting wheel in a raised position.
Figure 7B:
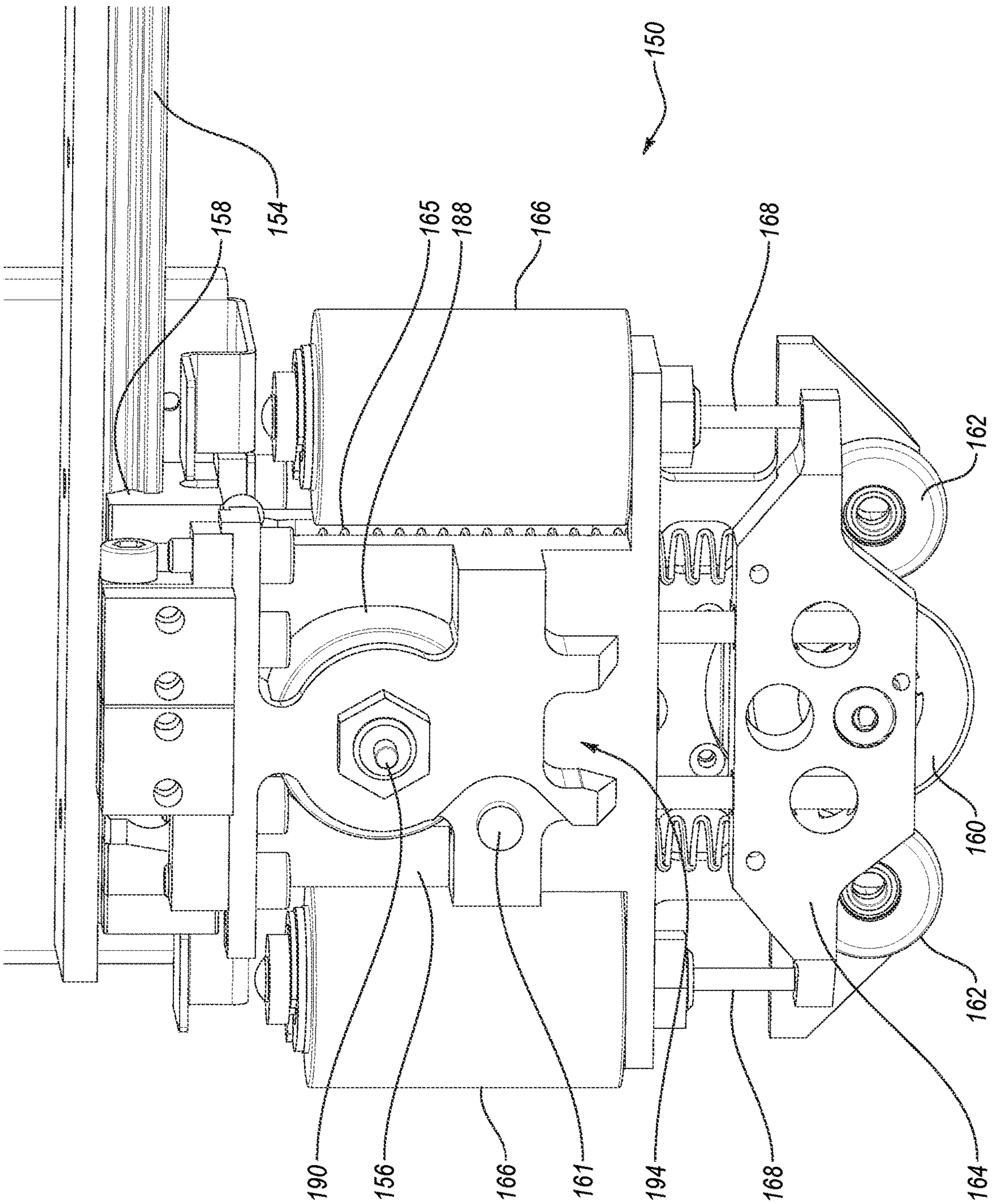
FIG. 7B is a perspective view of the crosshead converting tool of FIG. 7A, with the cutting wheel in a lowered position.

FIGS. 7A-7B illustrate perspective views of crosshead 150 and a portion of track 154 separate from the rest of converting cartridge 130. Crosshead 150 includes a body 156 with a slider 158 and a sensor 161. Slider 158 connects crosshead 150 to track 154 to allow crosshead 150 to move back and forth along track 154. Crosshead 150 also includes one or more converting instruments, such as a cutting wheel 160 and creasing wheels 162, which may perform one or more transverse conversions on sheet material 104. More specifically, as crosshead 150 moves back and forth over sheet material 104, cutting wheel 160 and creasing wheels 162 may create creases, bends, folds, perforations, cuts, and/or scores in sheet material 104.

While creasing wheels 162 are able to rotate, creasing wheels 162 may remain in substantially the same vertical position relative to body 156. In contrast, cutting wheel 160 may be selectively raised and lowered relative to body 156. For instance, as shown in FIG. 7A, cutting wheel 160 may be raised so that cutting wheel 160 does not cut sheet material 104 as crosshead 150 moves over sheet material 104. Alternatively, as shown in FIG. 7B, cutting wheel 160 may be lowered in order to cut sheet material 104 as crosshead 150 moves over sheet material 104.

In the illustrated embodiment, cutting wheel 160 is rotatably mounted on a cutting wheel frame 164. Cutting wheel frame 164 is movably connected to body 156. In particular, cutting wheel frame 164 is slidably mounted on one or more shafts 163. Cutting wheel frame 164 is held on shafts 163 and biased toward the raised position by one or more springs 165 that are connected between body 156 and cutting wheel frame 164.

One or more solenoids 166 may be used to selectively move cutting wheel frame 164 and cutting wheel 160 from the raised position (FIG. 7A) to the lowered position (FIG. 7B). Solenoids 166 each include a solenoid plunger 168 that extends and retracts upon activation and deactivation of solenoids 166. When solenoid plungers 168 are retracted, cutting wheel frame 164 and cutting wheel 160 are raised (via springs 165 and/or the normal forces from sheet material 104) so that cutting wheel 160 does not cut sheet material 104. In contrast, when solenoids 166 are activated, solenoid plungers 168 extend, thereby causing cutting wheel frame 164 and cutting wheel 160 to be lowered (FIG. 7B) so that cutting wheel 160 cuts sheet material 104.

While the present disclosure references the use of solenoids to move various components, such reference is made merely by way of example. Other types of actuators may be used to perform the functions described herein. For instance, other linear or non-linear actuators may be used, including voice coils, linear motors, rotational motor, lead screws, and the like. Accordingly, reference to solenoids is not intended to limit the scope of the present invention. Rather, the present invention may employ solenoids or any other actuator capable of performing the functions described herein in connection with solenoids.

As shown in FIG. 5, converting cartridge 130 includes a support plate 167 positioned below crosshead 150. Support plate 167 supports sheet material 104 as cutting wheel 160 and creasing wheels 162 perform the transverse conversions on sheet material 104. Additionally, support plate 167 includes a channel 169 that is aligned with and able to receive at least a portion of cutting wheel 160. When cutting wheel 160 is lowered to cut through sheet material 104, cutting wheel 160 may extend through sheet material 104 and at least partially into channel 169. As a result, cutting wheel 160 may extend entirely through sheet material 104 without engaging support plate 167, which could result in undue wear.

In order to reduce the amount of force required of solenoids 166 (and thus the power required to activate solenoids 166) to cut through sheet material 104, the kinetic energy of the moving components of crosshead 150 may be used to assist in cutting through sheet material 104. More specifically, the activation of solenoids 166 causes solenoid plungers 168 to move as they extend out of solenoids 166. The movement of solenoid plungers 168 causes cutting wheel frame 164 and cutting wheel 160 to move as well. As solenoid plungers 168, cutting wheel frame 164, and cutting wheel 160 begin to move, they build up momentum, and thus kinetic energy, until cutting wheel 160 engages sheet material 104. When cutting wheel 160 engages sheet material 104, the built-up kinetic energy of solenoid plungers 168, cutting wheel frame 164, and cutting wheel 160 works with the force provided by solenoids 166 to cut through sheet material 104. Thus, utilizing the kinetic energy of the components of crosshead 150 in this way reduces the forces required of solenoids 166.

In some converting machines, a cut is made in a material by moving a cutting tool over the material to a location where the cut needs to begin. Prior to initiating the cut, the cross movement of the cutting tool is stopped. Then the cutting tool is lowered to penetrate the material and the cross movement of the cutting tool is resumed. In such a situation, a relatively significant amount of force may be required to lower the cutting tool and penetrate the material. This is partially due to the fact that some of the force used to lower the cutting tool will be used to compress the material before the cutting tool actually penetrates through the material. The compression of the material is at least partially due to a relatively large chord of the cutting tool trying to cut through the material at the same time.

In contrast, converting machine 100 may include an "on-the-fly" mode where the movement of crosshead 150 over sheet material 104 and the lowering of cutting wheel 160 are combined to initiate a cut through sheet material 104. In an on-the-fly mode, crosshead 150 may begin moving across sheet material 104 toward the location where a cut needs to be made in sheet material 104. Rather than stopping the cross movement of crosshead 150 before beginning to lower cutting wheel 160, cutting wheel 160 is lowered while crosshead 150 continues to move across sheet material 104. The cross movement of crosshead 150 and the lowering of cut wheel 160 may be timed so that cutting wheel 160 engages and initiates a cut in sheet material 104 at the desired location.

In an on-the-fly mode, less force is required of solenoids 166 to lower cutting wheel 160 in order to initiate a cut through sheet material 104. The decreased force is at least partially due to a smaller chord of cutting wheel 160 being used to initiate the cut in sheet material 104. More specifically, as crosshead 150 moves across sheet material 104 and cutting wheel 160 is lowered into engagement with sheet material 104, only a leading edge of cutting wheel 160 will be used to initiate the cut. As a result, less of the force used to lower cutting wheel 160 will be expended in compressing sheet material 104 before cutting wheel 160 is able to penetrate sheet material 104.

Furthermore, a pulse-width modulation (PWM) circuit board or other voltage adjusting electric components may generate sufficiently high currents within solenoids 166 so that solenoids 166 are able to generate enough force to cut through sheet material 104. Once cutting wheel 160 has initiated a cut through sheet material, the PWM circuit board or other voltage adjusting electric components may reduce the current in solenoids 166, while still enabling solenoids 166 to maintain cutting wheel 160 in the lowered position. In other words, a relatively high current may be generated in solenoids 166 to provide enough force to enable cutting wheel 160 to penetrate sheet material 104. Once cutting wheel 160 has penetrated sheet material 104, the current in solenoids 166 may be reduced, while still enabling solenoids 166 to continue cutting through sheet material 104.

The ability to use varying voltages/currents to initiate and continue making a cut in sheet material 104 is made possible, at least in part, by the characteristics of solenoids 166. Solenoids have unique force-to-stroke curve profiles. In the beginning of a solenoid's stroke, the solenoid has a relatively limited force. Further into the solenoid's stroke, the force increases dramatically. Accordingly, a relatively high voltage/current can be used during the solenoid's stroke in order to generate the relative large force at the end of the stroke so that the cutting wheel may penetrate the sheet material. At the end of the solenoid's stroke (e.g., when the plunger is fully extended), the voltage/current can be reduced while still maintaining a relative high holding force. That is, even with the reduced voltage/current, the solenoid may have enough force to hold the cutting wheel in place so that the cutting wheel continues cutting sheet material 104.

Being able to adjust to the voltage level supplied to solenoids 166 (and thus the current in solenoids 166) can also be beneficial for various reasons. For instance, less power can be used to achieve the desired results. For example, high voltage can be used for a short time in order to initiate a cut, while lower voltage can be used to continue making the cut. Not only does this reduce the overall amount of power required, but it can improve the performance of certain components. For instance, limiting high voltage supplies to relatively short durations can prevent the temperature of solenoids 166 from increasing or overheating due to high currents in solenoids 166. Higher temperatures or overheating of solenoids 166 can cause damage thereto and/or reduce their activation force. The ability to adjust the voltage can also be beneficial when activating solenoids 166 when no sheet material 104 is below cutting wheel 160 ("dry-firing"). For instance, if solenoids 166 were dry-fired with a high voltage, cutting wheel 160 may be lowered too far or too rapidly, potentially resulting in damage and/or excessive mechanical wear.

When crosshead 150 has finished performing the transverse conversions on sheet material 104, crosshead 150 may be used to move pressure roller **134*b* from the activated position to the deactivated position. More specifically, when it is desired to stop advancing sheet material 104, crosshead 150 may be moved adjacent to pressure roller block 138 such that a portion of crosshead 150 engages pressure roller cam 142. As noted above, engagement of pressure roller cam 142 causes pressure roller block 138 and pressure roller 134 to pivot about hinge 140 to the deactivated position. As shown in FIG. 6C, crosshead 150 includes a horizontally oriented wheel 171 that can engage pressure roller cam 142 to move pressure roller 134*b*** to the deactivated position.

In addition to being able to create transverse conversions with crosshead 150, conversion functions may also be made on sheet material 104 in a direction substantially parallel to the direction of movement and/or the length of sheet material 104. Conversions made along the length of and/or generally parallel to the direction of movement of sheet material 104 may be considered "longitudinal conversions."

Longheads 152 may be used to create the longitudinal conversions on sheet material 104. More specifically, longheads 152 may be selectively repositioned along the width of converting cartridge 130 (e.g., back and forth in a direction that is perpendicular to the length of sheet material 104) in order to properly position longheads 152 relative to the sides of sheet material 104. By way of example, if a longitudinal crease or cut needs to be made two inches from one edge of sheet material 104 (e.g., to trim excess material off of the edge of sheet material 104), one of longheads 152 may be moved perpendicularly across sheet material 104 to properly position longhead 152 so as to be able to make the cut or crease at the desired location. In other words, longheads 152 may be moved transversely across sheet material 104 to position longheads 152 at the proper location to make the longitudinal conversions on sheet material 104.

Figure 8:
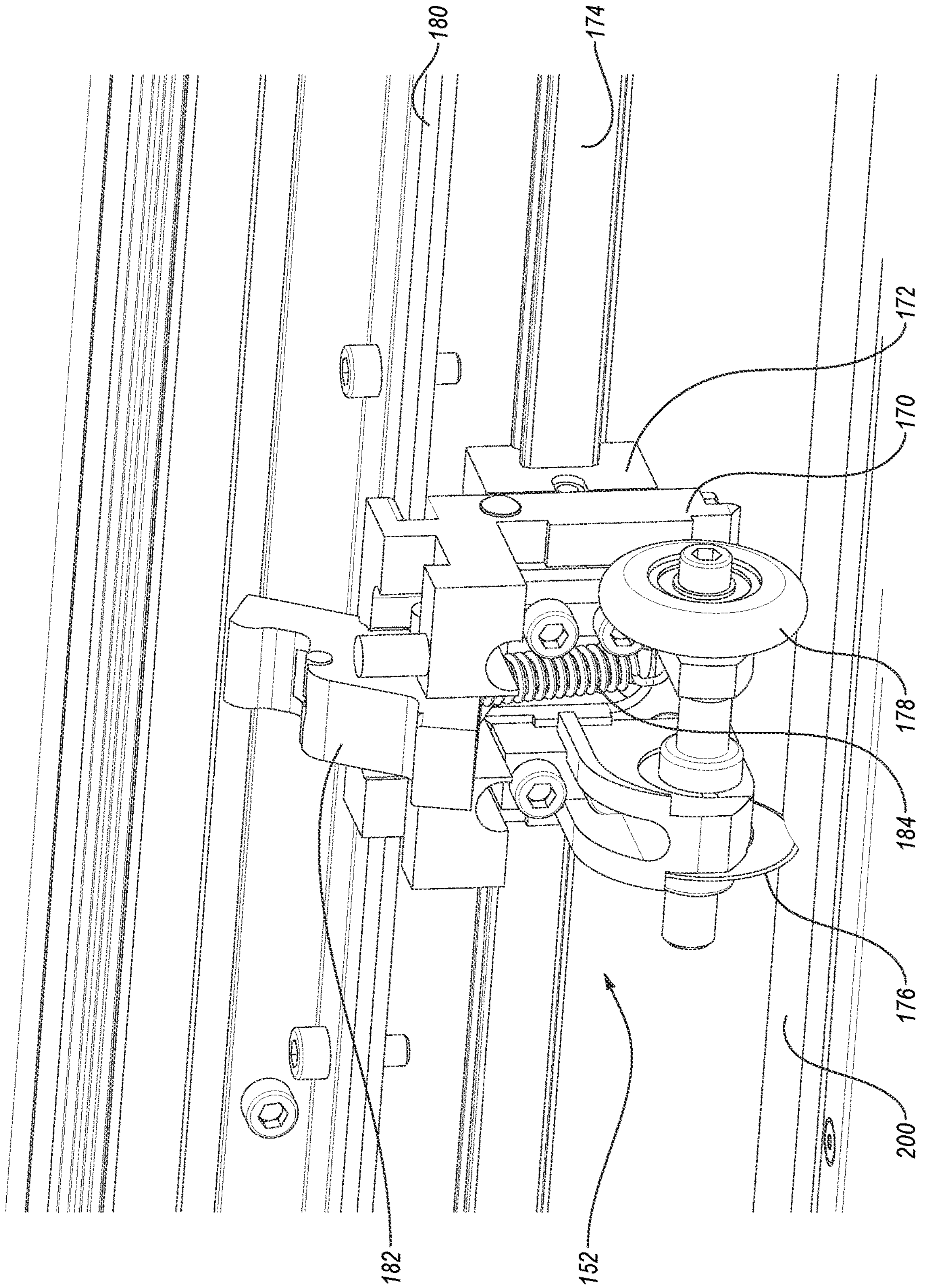
FIG. 8 is a perspective view of a longhead converting tool of the converting cartridge of FIG. 5.

FIG. 8 illustrates a close-up view of a portion of converting cartridge 130, including one of longheads 152. As can be seen, longhead 152 includes a body 170 with a slider 172. Slider 172 connects longhead 152 to a track 174 to allow longhead 152 to move back and forth along at least a portion of the width of converting cartridge 130. Longhead 152 may include one or more converting instruments, such as cutting wheel 176 and creasing wheel 178, which may perform the longitudinal conversions on sheet material 104. More specifically, as sheet material 104 moves underneath longhead 152, cutting wheel 176 and creasing wheel 178 may create creases, bends, folds, perforations, cuts, and/or scores in sheet material 104.

As can be seen in FIGS. 5 and 8, converting assembly 130 may also include a converting roller 200 positioned below longheads 152 so that sheet material 104 passes between converting roller 200 and cutting wheel 176 and creasing wheel 178. Converting roller 200 may support sheet material 104 while the longitudinal conversions are performed on sheet material 104. Additionally, converting roller 200 may advance packaging templates 108 out of converting assembly 114 after the conversion functions are completed. Additional detail regarding converting roller 200 will be provided below.

Cutting wheel 176 and creasing wheel 178 are rotatably connected to body 170 and oriented to be able to make the longitudinal conversions. In some embodiments, cutting wheel 176 and creasing wheel 178 may be pivotally connected to body 170 and/or longhead 152 may be pivotally connected to slider 172. As sheet material 104 advances through converting assembly 114, sheet material 104 may not advance in a perfectly straight line. By allowing longhead 152, cutting wheel 176, and/or creasing wheel 178 to pivot, the orientation of cutting wheel 176 and creasing wheel 178 may change to more closely follow the feeding direction of sheet material 104. Additionally, the braking force (discussed below) required to maintain longhead 152 in place may be reduced because sheet material 104 will apply less side force to cutting wheel 176 and creasing wheel 178. Similarly, the biasing force required to bias movable guide channels **132*a* toward fixed channels 132*b*** may likewise be reduced.

Figure 9A:
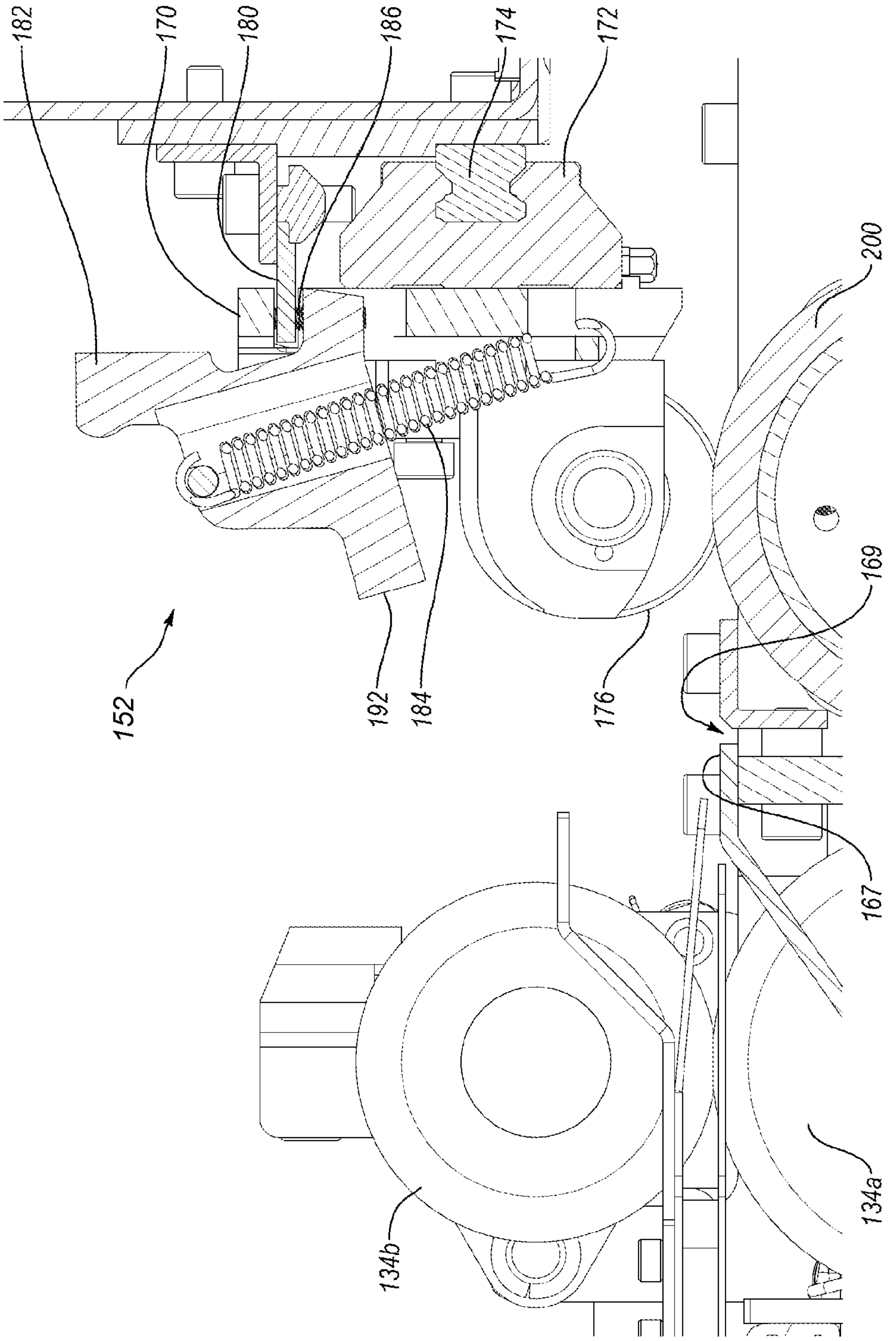
FIG. 9A is a partial cross-sectional view of the converting cartridge of FIG. 5 showing a braking mechanism for securing a longhead converting tool in place.
Figure 9B:
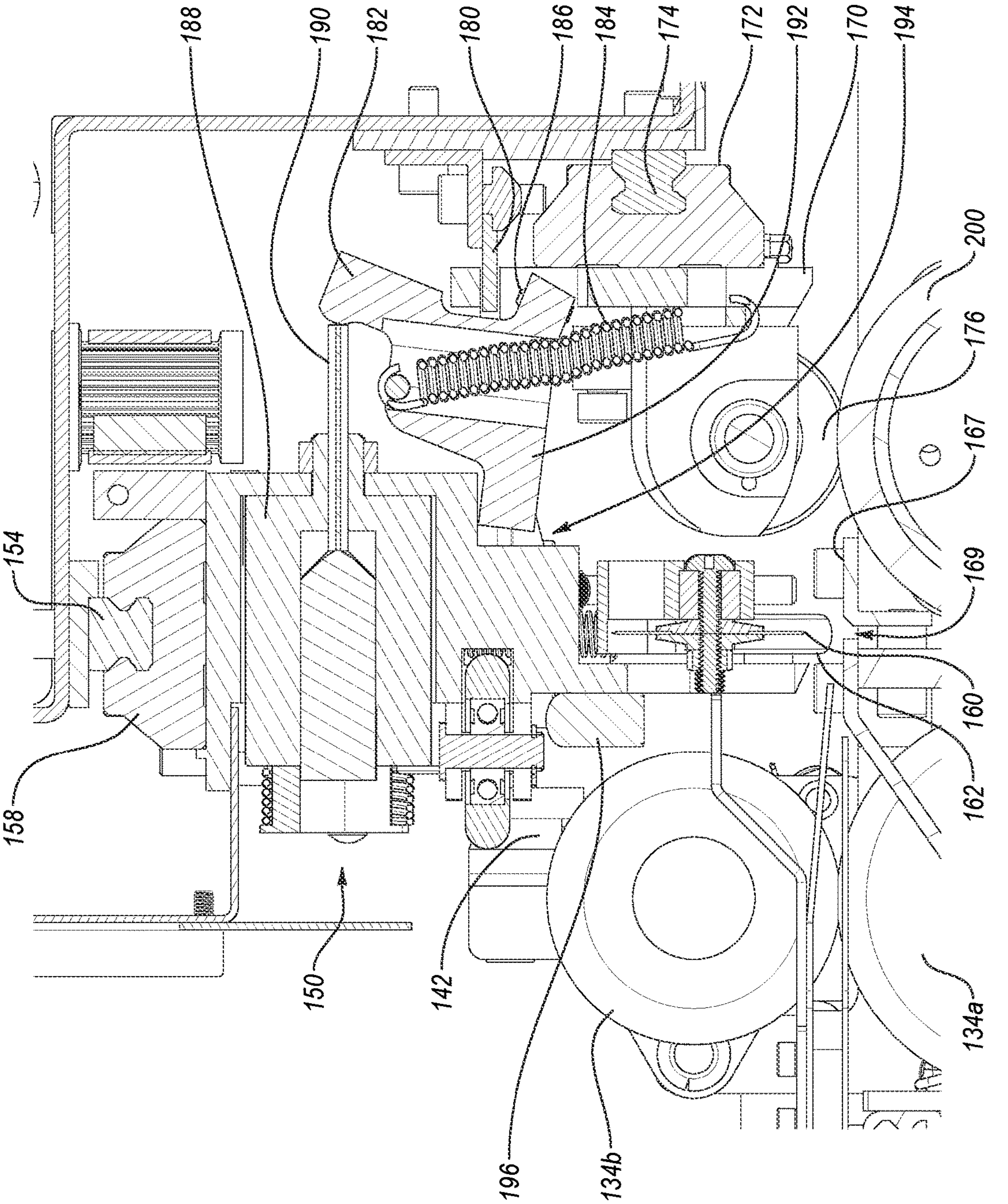
FIG. 9B is a partial cross-sectional view of the converting cartridge of FIG. 5 showing the braking mechanism released to allow for movement of the longhead converting tool.

When longhead 152 has been repositioned at the desired location along the width of converting cartridge 130, longhead 152 may be secured in place. More specifically, once positioned as desired, longhead 152 may be secured to a brake belt 180, other another portion of converting cartridge 130. FIGS. 9A and 9B illustrate cross-sectional views of longhead 152 and one exemplary mechanism for securing longhead 152 to brake belt 180. As can be seen, longhead 152 includes a brake pivot arm 182 that is pivotally connected to body 170. A spring 184 is connected between brake pivot arm 182 and body 170 to bias brake pivot arm 182 to the locked position, shown in FIG. 9A. When brake pivot arm 182 is in the locked position, an engagement member 186 is held against or pressed into brake belt 180. Spring 184 may bias brake pivot arm 182 toward the locked position with sufficient force that engagement member 186 is held against or pressed into brake belt 180 with sufficient force to prevent longhead 152 from moving along the length of track 174.

When it is desired to reposition longhead 152 along the length of track 174, brake pivot arm 182 may be pivoted to disengage engagement member 186 from brake belt 180, as shown in FIG. 9B. The pivoting of brake pivot arm 182 may be accomplished using a solenoid 188 that is mounted on crosshead 150 (FIGS. 7A, 7B, 9B). In order to pivot brake pivot arm 182 with solenoid 188, crosshead 150 is first moved into alignment with longhead 152. Solenoid 188 is then activated, which causes a solenoid plunger 190 to extend and engage brake pivot arm 182, as shown in FIG. 9B. As solenoid plunger 190 engages brake pivot arm 182, brake pivot arm 182 pivots, which causes engagement member 186 to disengagement brake belt 180.

Notably, spring 184 is connected between body 170 and brake pivot arm 182 in such a way that the force required of solenoid 188 to pivot brake pivot arm 182 remains substantially constant. As brake pivot arm 182 is pivoted from the locked position (FIG. 9A) to the unlocked position (FIG. 9B), spring 184 is stretched. As spring 184 stretches, the force that would normally be required to continue pivoting pivot brake arm 182 would continue to increase. However, as brake pivot arm 182 pivots, the connection location between spring 184 and brake pivot arm 182 begins to move over the pivot location of brake pivot arm 182 and the connection location between spring 184 and body 170 so that spring 184 is oriented more vertically. The more vertical orientation of spring 184 reduces the horizontal force that spring 184 applies to brake pivot arm 182. Thus, the increased force normally required to stretch spring 184 is generally offset by the reduced horizontal force applied to brake pivot arm 182 by spring 184.

With engagement member 186 disengaged from brake belt 180, longhead 152 may be repositioned along the length of track 174. Rather than equipping longhead 152 with an actuator dedicated to repositioning longhead 152, crosshead 150 may be used to reposition longhead 150. More specifically, crosshead 150 and longhead 152 may be connected together or otherwise engaged such that movement of crosshead 150 results in movement of longhead 152. This arrangement, therefore, only requires the ability to actively control crosshead 150, while longhead 152 may be passively moved by crosshead 150. Furthermore, longheads 152 do not require electric sensors and electric or pneumatic actuators. As a result, longheads 152 do not need to be connected to electrical power or compressed air, such as with electrical cables/wires and hoses in a cable chain. This enables a much more cost-effective design of longheads 152, as well as enables a more cost-effective manufacturing and maintenance friendly design of the whole converting assembly 114 and converting machine 106.

One exemplary manner for selectively connecting longhead 152 to crosshead 150 is shown in FIG. 9B. When crosshead 150 is aligned with longhead 152 and brake pivot arm 182 is pivoted (e.g., to disengage engagement member 186 from brake belt 180), a portion of brake pivot arm 182 may engage crosshead 150 so as to connect longhead 152 to crosshead 150. More specifically, an extension 192 on brake pivot arm 182 may pivot into a notch 194 on body 156 of crosshead 150. As long as extension 192 is positioned within notch 194, the movements of crosshead 150 and longhead 152 will be linked together. That is, when extension 192 is positioned within notch 194 and crosshead 150 is moved, longhead 152 will move with crosshead 150.

FIGS. 7A-7B show notch 194 formed on the side of body 156 of crosshead 150. As can be seen, notch 194 can include a flared opening that can assist with guiding extension 192 into notch 194. For instance, if longhead 152 has moved slightly since last being positioned, the flared opening can guide extension 192 in notch 194 and thereby correct minor position errors of longhead 152. Once crosshead 150 has repositioned longhead 152, extension 192 is released from notch 194 and longhead 152 is locked into place. Notably, longhead 152 will be locked into place at the correct location since any positioning errors of longhead 152 will have been corrected when extension 192 was pivoted into notch 194. As a result, converting machine 106 can be operating without requiring frequent resetting or manual adjustments to longheads 152.

Notch 194 can also include substantially vertical interior walls. The vertical interior walls of notch 194 apply the forces to extension 192 that result in the movement of longhead 152. Notably, the vertically walls of notch 194 only apply horizontal forces on extension 192. Since notch 194 does not apply any downward forces on extension 192, the force required of solenoid 188 to maintain brake pivot arm 182 in the unlocked position is reduced. In connection therewith, a relatively low amount of power is required by solenoid 188 to maintain brake pivot arm 182 in the unlocked position while longhead 152 is moved.

Like solenoids 166, the kinetic energy of solenoid plunger 190 may be used to reduce the amount of force required of solenoid 188 (and thus the power required to activate solenoid 188). More specifically, the activation of solenoid 188 causes solenoid plunger 190 to move as it extends out of solenoid 188. As solenoid plunger 190 begins to move, it builds up momentum, and thus kinetic energy. When plunger 190 engages brake pivot arm 182, the built-up kinetic energy of plunger 190 works with the force provided by solenoid 188 to pivot brake pivot arm 182 so as to disengage engagement member 186 from brake belt 180. In addition to disengaging engagement member 186, pivoting of brake pivot arm 182 causes brake pivot arm 182 to build up kinetic energy. The combined kinetic energy of plunger 190 and brake pivot arm 182 similarly reduces the force required of solenoid to correct minor position errors of longhead 152 and to connect crosshead 150 to longhead 152. Specifically, the kinetic energy of plunger 190 and brake pivot arm 182 facilitates insertion of extension 192 into notch 194, which both corrects position errors of longhead 152 and connects crosshead 150 and longhead 152 together.

As shown in FIG. 5, the illustrated embodiment includes two longheads 152. It will be appreciated, however, the converting cartridge 130 may include one or more longheads 152. Regardless of how many longheads 152 are included, crosshead 150 may be used to selectively move each longhead 152 individually. A normal setup for creating regular slotted box (RSC) packaging templates requires at least three longheads, of which two are equipped with crease tools, and one with a side-trim knife. In order to enable side-trimming on the outer side of each track of the sheet material, a forth longhead with a knife is added on the opposite side of the first knife longhead. Furthermore, in order to avoid having to move the longheads long distances from one track to the other, two additional crease tools may be added in the middle. Thereby a set of two crease longheads and one cut longhead are mainly used for one track, and another identical—but mirrored—setup is used mainly for the other track. This also enables conversion to more complicated packaging template designs, where the four creasing longheads can each create a longitudinal crease, while either of the cut longheads may be used for side-trimming. A seventh longhead equipped with a knife may be added in the middle, thereby enabling two packaging templates to be created in parallel, side-by-side.

As noted above, crosshead 150 includes a sensor 161. Sensor 161 may be used to detect the presence of longheads 152 adjacent to crosshead 150. For instance, when it is desired to reposition a longhead 152, crosshead 150 may move across converting cartridge 130 to the location where a longhead 152 is supposed to be (according to a control system). Once crosshead 150 is so positioned, sensor 161 may be used to confirm that longhead 152 is at the proper position. Upon detection of the longhead 152 by sensor 161, solenoid 188 may be activated so as to release the braking mechanism of the longhead 152 and connect the longhead 152 to crosshead 150. Once crosshead 150 has moved the longhead 152 to the desired location, sensor 161 may be used to confirm the proper positioning of the longhead 152 at the desired location (either before or after disengagement between crosshead 150 and longhead 152).

Sensor may also be used to count the number of longheads 152 and determine the current position of each longhead 152. Converting machine 100 may include control circuitry or be connected to a computer that monitors the positions of longheads 152 and controls crosshead 150. In the event that sensor 161 does not detect a longhead 152 at the last known position, the control circuitry can direct crosshead 150 to move across converting cartridge 130 so that sensor 161 may detect the location of the missing longhead 152. If sensor 161 is unable to locate each of the longheads 152 after a predetermined number of attempts, an error message may be generated to direct an operator to manually locate the longheads 152 or call for maintenance or service.

In addition to detecting and monitoring the location of longheads 152, crosshead 150 may include a sensor 196 (FIG. 9B) that detects the position of guide channels 132. For instance, as crosshead 150 move back and forth across converting cartridge 130, sensor 196 may detect the current location of each guide channel 132. Based on the detected locations, the control circuitry may determine if each guide channel 132 is in the proper location. For example, if the detected location of fixed guide channel **132*b* does not match the previously set location, it may be that fixed guide channel 132*b* has slipped or an operator adjusted fixed guide channel 132*b* without updating the control circuitry. In such a case, the control circuitry may generate an error message indicating that fixed guide channel 132*b* needs to be repositioned. Alternatively, the control circuitry may simply update the stored location of fixed guide channel 132*b* to the detected location and thereby determine the width of the sheet material 104** is being used.

Sensor 196 may similarly detect the current location of movable guide channel **132*a* so that the control circuitry may determine if movable guide channel 132*a* is in the proper position. As noted above, movable guide channel 132*a* is able to move to accommodate sheet material 104 of different widths. As a result, movable guide channel 132*a* may not be in the proper location if sheet material 104 has run out, if sheet material 104 is damaged, or converting machine 100 is loaded with sheet material 104 that is wider or narrower than what control circuitry is set for. In such cases, the control circuitry may generate an error message indicating that fixed guide channel 132*b* needs to be repositioned, new sheet material 104** needs to be loaded, or the like.

As noted above, converting roller 200 supports sheet material 104 as longheads 152 perform the longitudinal conversions on sheet material 104. Longheads 152 and converting roller 200 may be positioned relative to one another such that the conversion functions are performed on sheet material 104 as sheet material 104 passes between longheads 152 and converting roller 200. For instance, as shown in FIGS. 8-9B, cutting wheel 176 may extend into converting roller 200 so that there is no clearance between cutting wheel 176 and converting roller 200. As a result, sheet material 104 will be cut as it passes cutting wheel 176. Since creasing wheel 178 does not need to penetrate through sheet material 104, creasing wheel 178 may be positioned such that there is some clearance between creasing wheel 178 and converting roller 200.

Other arrangements of converting roller 200, cutting wheel 176, and creasing wheel 178 are also possible. For instance, in order to reduce or eliminate contact between cutting wheel 176 and converting roller 200, the rotational axis of cutting wheel 176 may be horizontally offset from the rotational axis of converting roller 200 such that cutting wheel 176 is positioned slightly behind converting roller 200. By horizontally offsetting cutting wheel 176 from converting roller 200, cutting wheel 176 may be positioned lower without extending further (or at all) into converting roller 200. The lower positioning of cutting wheel 176 may also ensure that cutting wheel 176 cuts through the entire thickness of sheet material 104.

Figure 10:
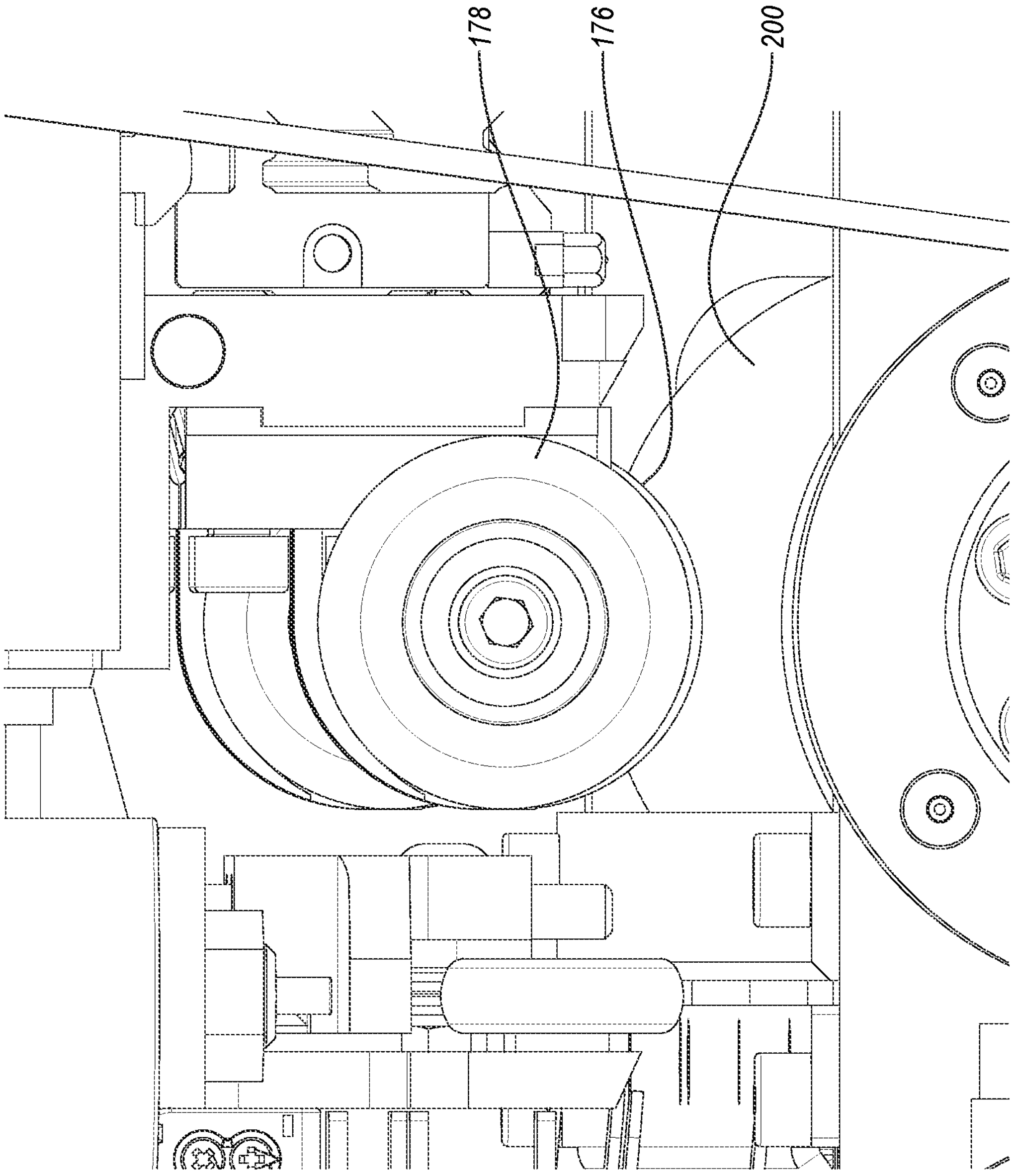
FIG. 10 illustrates a converting roller in a lowered position to enable repositioning of longhead converting tools.

In the case where cutting wheel 176 and/or creasing wheel 178 contact or extend into converting roller 200, it may be necessary to separate or otherwise disengage converting roller 200 and cutting wheel 176 and/or creasing wheel 178 before repositioning longheads 152. With attention to FIGS. 6A and 10-14, one exemplary mechanism is illustrated that may be used to selectively separate converting roller 200 and cutting wheel 176 and/or creasing wheel 178. In the illustrated embodiment, converting roller 200 is selectively raised and lowered to engage or disengage converting roller 200 from cutting wheel 176 and/or creasing wheel 178. Thus, rather than raising each longhead 152 to enable movement of each longhead 152, converting roller 200 may be lowered as shown in FIG. 10 to disengage all of longheads 152 at once and allow longheads 152 to be repositioned as desired. Lowering converting roller 200 to disengage longheads 152 eliminates any need to have sensors, actuators, or cables chains (for electrical power, compressed air) connected to longheads 152, giving the advantages noted above. This is especially important in an all-electric machine that does not include pneumatic actuators or that does not have access to compressed air.

As shown in FIG. 6A, converting roller 200 is mounted on shaft 202. Like feed roller **134*a*, converting roller 200 is rotated by stepper motor 146 via belt 148. When stepper motor 146 rotates belt 148 in a first direction (e.g., clockwise as shown in FIG. 6A), converting roller 200 is likewise rotated in the first direction, which advances sheet material 104 under longheads 152 and/or advances packaging templates 108 out of converting assembly 114. In contrast, when stepper motor 146 rotates belt 148 in a second direction (e.g., counterclockwise as shown in FIG. 6A), converting roller 200 is lowered to the position shown in FIG. 10**.

FIGS. 11-14 illustrate (separate from the rest of converting cartridge 130) converting roller 200 and the mechanism used to lower converting roller 200. As noted, converting roller 200 is mounted on shaft 202. A first end of shaft 202 extends through a bearing block 204 and has a gear 206 mounted thereon. As shown in FIG. 6A, belt 148 engages gear 206 in order to rotate shaft 202 and converting roller 200. A second end of shaft 202 extends into a bearing block 208.

Figure 11:
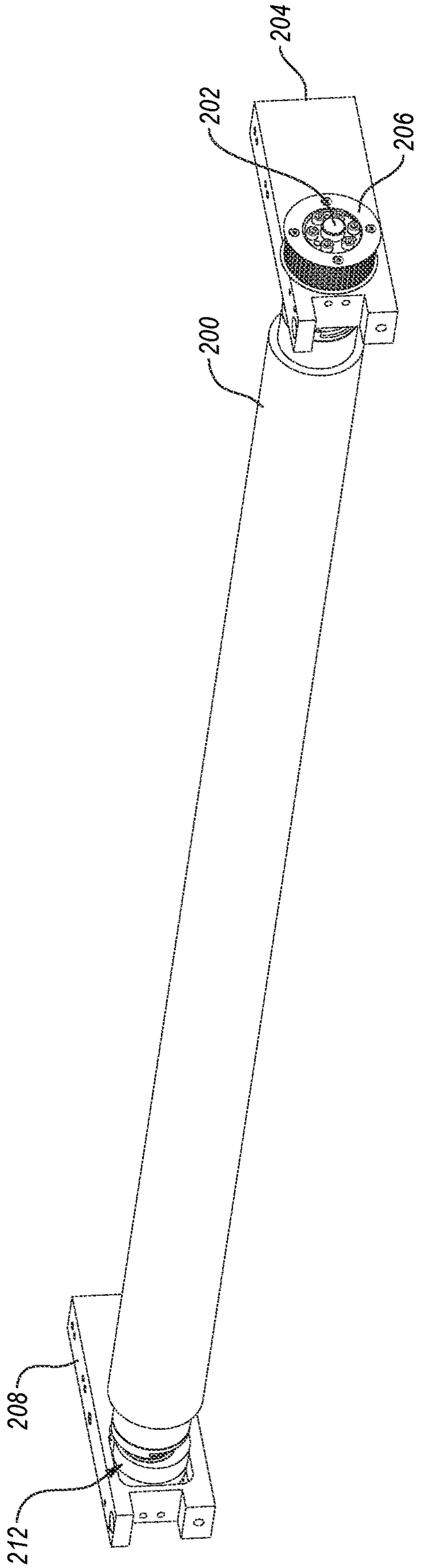
FIG. 11 illustrates a converting roller assembly.
Figure 12A:
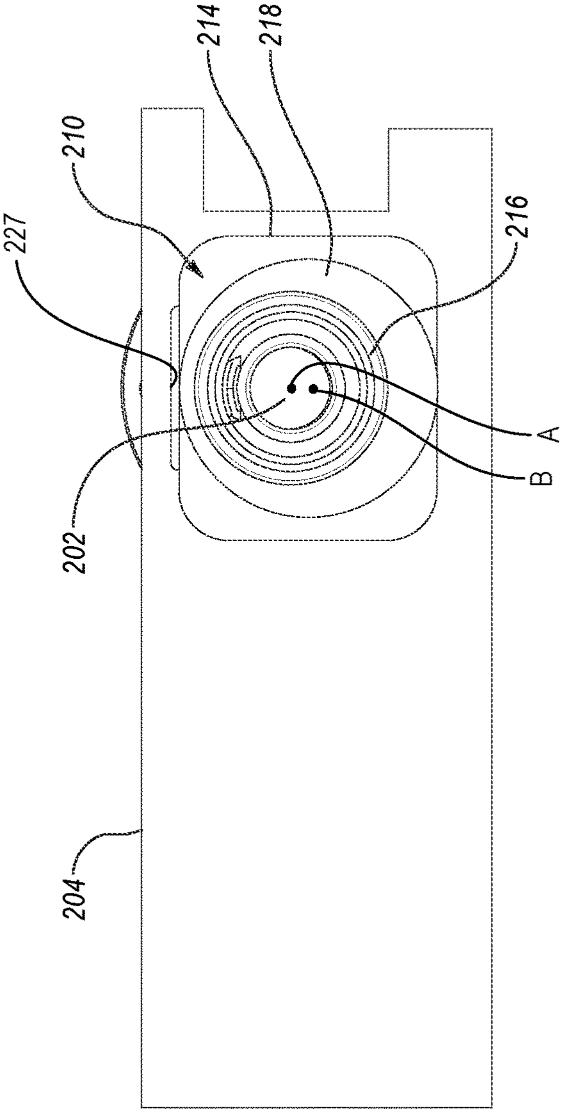
FIG. 12A illustrates an eccentric bearing assembly of the converting roller assembly of FIG. 11.
Figure 12B:
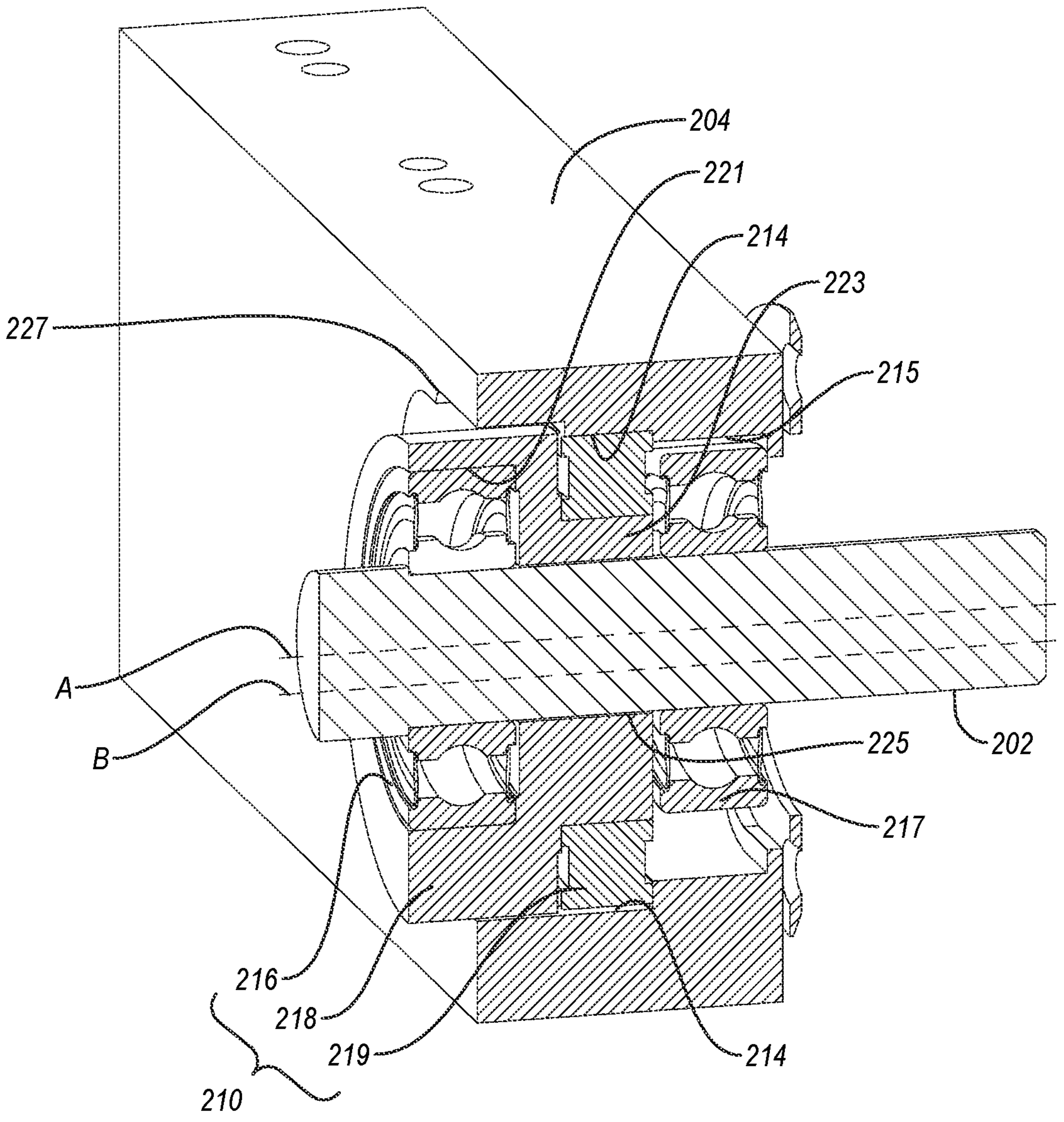
FIG. 12B illustrates a cross sectional view of the eccentric bearing assembly FIG. 12A.
Figure 12C:
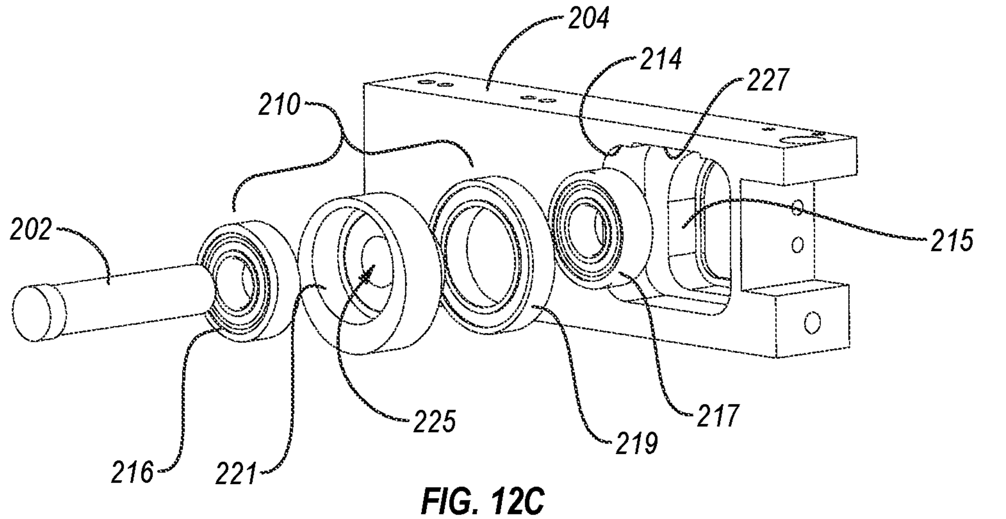
FIG. 12C illustrates a first exploded view of the eccentric bearing assembly of FIG. 12A.
Figure 12D:
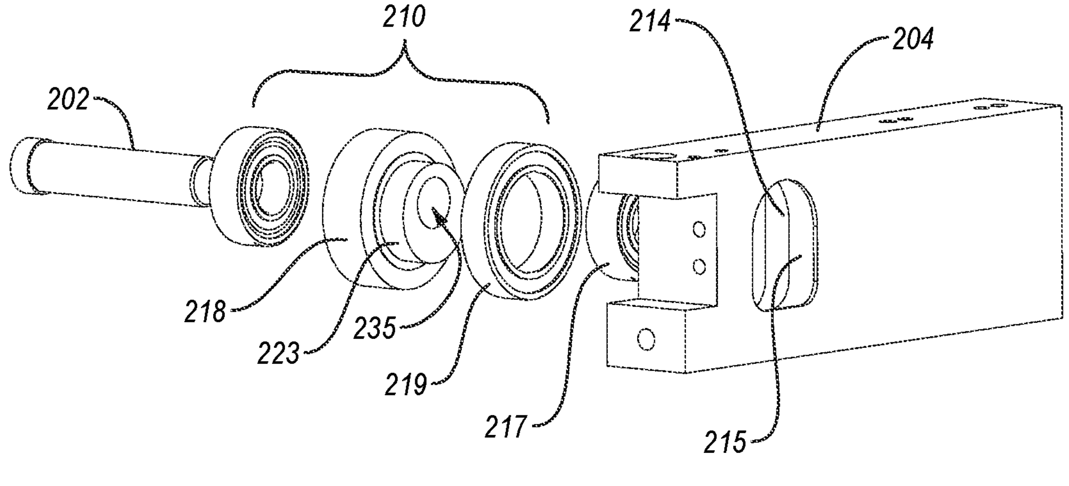
FIG. 12D illustrates a second exploded view of the eccentric bearing assembly of FIG. 12A.
Figure 13:
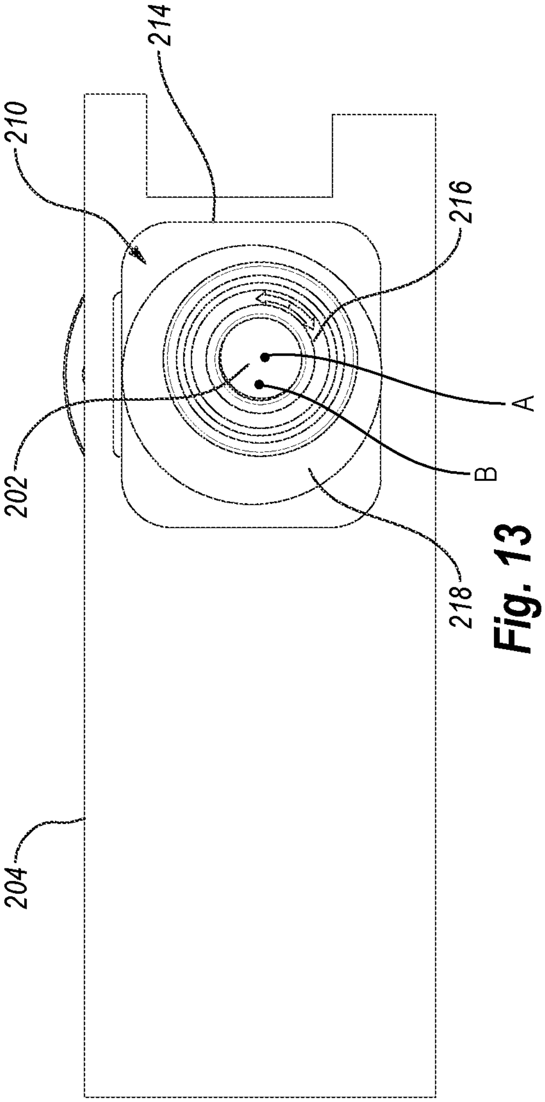
FIG. 13 illustrates the eccentric bearing assembly of FIG. 12 in a lowered position.

FIGS. 12A-13 illustrate an eccentric bearing assembly 210 that enables converting roller 200 to rotate in the first direction and be lowered when rotated in the second direction. FIGS. 12A-13 illustrate bearing block 204 and eccentric bearing assembly 210 mounted on the first end of shaft 202. More specifically, FIG. 12A illustrates a side view of eccentric bearing assembly 210 disposed in bearing block 204, FIG. 12B illustrates a cross sectional view of eccentric bearing assembly 210 and bearing block 204, and FIGS. 12C and 12D illustrate exploded views of eccentric bearing assembly 210 and bearing block 204. As shown in FIG. 11, the second end of shaft 202 also has an eccentric bearing assembly 212 that is substantially similar to eccentric bearing assembly 210.

As shown in FIGS. 12A-12D, bearing block 204 includes a generally square recess 214 in which eccentric bearing assembly 210 is positioned and is able to rotate. Bearing block 204 also includes a generally rectangular recess 215 formed therein. Shaft 202 extends through recesses 214, 215 and has eccentric bearing assembly 210 and a bearing 217 mounted thereon, as shown in FIG. 12B. Bearing 217 is mounted on shaft 202 and positioned within recess 215 to enable shaft 202 to move within recess 215 (e.g., when converting roller 200 is raised or lowered) in a low friction and long-lasting manner.

Eccentric bearing assembly 210 includes a one-way bearing 216, an eccentric bearing block 218, and a two-way bearing 219. As shown, eccentric bearing block 218 includes a recess 221 in which one-way bearing 216 is disposed. Eccentric bearing block 218 also includes a projection 223 on which bearing 219 is mounted. Bearing 219 enables eccentric bearing block 218 to rotate within and relative to recess 214 (e.g., when converting roller 200 is raised or lowered) in a low friction and long-lasting manner. Furthermore, eccentric bearing block 218 includes an aperture 225 through which shaft 202 extends.

As best seen in FIG. 12B, shaft 202 has a central rotational axis A about which converting roller 200 rotates when belt 148 rotates shaft 202 in the first direction. One-way bearing 216, bearing 217, recess 221, and aperture 225 are mounted on or disposed around shaft 202 so as to have central axes that are coaxial with axis A. In contrast, eccentric bearing block 218, projection 223, and bearing 219 share a common rotational axis B that is offset from axis A.

When belt 148 rotates shaft 202 in the first direction, one-way bearing 216 allows shaft 202 to rotate in the first direction, relative to eccentric bearing block 218, and about axis A. In contrast, when belt 148 rotates shaft 202 in the second direction, one-way bearing 216 locks together with eccentric bearing block 218 to prevent relative movement between shaft 202 and eccentric bearing block 218. Thus, when shaft 202 is rotated in the second direction, eccentric bearing block 218 also rotates in the second direction.

When eccentric bearing block 218 is rotated in the second direction, eccentric bearing block 218 rotates about axis B. Rotation of eccentric bearing block 218 about axis B causes shaft 202 to revolve around axis B. As shown in FIG. 13, when eccentric bearing block 218 is rotated in the second direction about axis B, shaft 202 revolves around axis B so that shaft 202 is lowered from the position shown in FIG. 12A. As a result, converting roller 200 is lowered when rotated in the second (e.g., reverse) direction.

As shown in FIG. 6A, a spring-loaded tensioner 220 creates tension in belt 148. The tension in belt 148 applies a force on gear 206 that has both an upward vertical component and a horizontal component. As discussed in greater detail below, a spring mechanism applies a similar force on eccentric bearing assembly 212. As a result of the forces applied to gear 206 and eccentric bearing assembly 212, eccentric bearing assembly 210 and eccentric bearing assembly 212 automatically rotate back to the raised position shown in FIG. 12 when belt 148 begins rotating shaft 202 in the first direction again. In this way, eccentric bearing assembly 210 and eccentric bearing assembly 212 are synchronized (both raised or both lowered).

More specifically, in order to lower converting roller 200, belt 148 rotates shaft 202 in the second direction, which causes the eccentric bearing blocks in eccentric bearing assemblies 210, 212 to rotate about axis B. If the eccentric bearing blocks are rotated in the second direction more or less than 180 degrees, then the upward forces on eccentric bearing assemblies 210, 212 will have enough of a mechanical advantage to automatically rotate eccentric bearing assemblies 210, 212 back to the raised position when belt 148 begins to rotate shaft 202 in the first direction. This is due to the fact that the upward forces will not be acting directly under axis B. However, if the eccentric bearing blocks are rotated 180 degrees in the second direction (e.g., so the upward forces are acting directly under axis B), then the upward forces on eccentric bearing assemblies 210, 212 may not have enough of a mechanical advantage to automatically rotate eccentric bearing assemblies 210, 212 back to the raised position. In such a case, belt 148 may be rotated further in the second direction so that the upward forces will have enough of a mechanical advantage to automatically rotate eccentric bearing assemblies 210, 212 back to the raised position.

In order to ensure that eccentric bearing assemblies 210, 212 are synchronized or to correct any lack of synchronization therebetween, belt 148 may be rotated in the second direction and then in the first direction to reset eccentric bearing assemblies 210, 212. For instance, belt 148 may be rotated 45 degrees in the second direction and then 45 degrees in the first direction. By rotating in the second direction less than 180 degrees, it is assured that the upward forces are not acting directly under axis B. As a result, when belt 148 is rotated in the first direction, the upward forces will have a sufficient mechanical advantage to cause eccentric bearing assemblies 210, 212 to automatically rotate to the raised position.

The forces provided by tensioner 220 also counter most downward forces applied to converting roller 200 by sheet material 104 and longheads 152, thereby preventing eccentric bearing assembly 210 from rotating and lowering converting roller 200 when belt 148 is not rotating in the second direction. However, recess 214, eccentric bearing block 218, and bearing 219 are sized and arranged to prevent eccentric bearing assembly 210 from unintentionally rotating and lowering converting roller 200 in the event that a downward force is applied to converting roller 200 that would overcome the upward force provided by tensioner 220.

During normal operation (e.g., when sufficient downward forces are not applied to converting roller 200 to overcome the upward forces provided by tensioner 220), bearing 219 allows for eccentric bearing assembly 210 to operate as described above. More specifically, as can best be seen in FIG. 12B, bearing 219 has a slightly smaller outer diameter than eccentric bearing block 218 and recess 214 includes a notch 227 directly above eccentric bearing block 218. As a result, the upward forces provided by tensioner 220 cause bearing 219 to engage the upper interior surface of recess 214. At the same time, however, eccentric bearing block 218 does not engage the upper surface of recess 214. Rather, the upper surface of eccentric bearing block 218 extends into notch 227. This arrangement allows for eccentric bearing block 218 to rotate about axis B when belt 148 rotates shaft 202 in the second direction.

In the event that a sufficiently large downward force is applied to converting roller 200 to overcome the upward force provided by tensioner 220, converting roller 200 is lowered slightly until eccentric bearing block 218 engages the lower surface of recess 214. As can be seen in FIG. 12B, the larger outer diameter of eccentric bearing block 218 causes eccentric bearing block 218 to engage the lower surface of recess 214 while still providing clearance between bearing 219 and the lower surface of recess 214. As a result, friction is created between eccentric bearing block 218 and the lower surface of recess 214. The friction created therebetween can be sufficient to prevent eccentric bearing block 218 from rotating about axis B, and thereby preventing the unintentional lowering of converting roller 200.

Tensioner 220, and particularly the location of tensioner 220, allows for converting roller 200 to be lowered and raised as well as providing a relatively consistent rotational force to active roller 134*a*. Tensioner 220 is connected to belt 148 between stepper motor 146 and converting roller 200, as opposed to being connected to belt 148 between stepper motor 146 and active roller 134*a*. Not having tensioner 220 connected to belt 148 between stepper motor 146 and active roller 134*a* ensures that belt 148 provides a relatively consistent force to active roller 134*a*, which allows for relatively consistent feeding of sheet material 104 through converting assembly 114. In contrast, connecting tensioner 220 between stepper motor 146 and converting roller 200 allows for the force applied by belt 148 to converting roller 200 to vary. For instance, when belt rotates converting roller 200 in the first direction, belt 148 provides a given force on converting roller 200. When belt 148 rotates converting roller 200 in the second direction, tensioner 200 reduces the upward force applied to converting roller 200, thereby allowing converting roller 200 to be lowered as described above.

Eccentric bearing assembly 212 on the second end of shaft 202 provides the same functionality as eccentric bearing assembly 210. Specifically, when shaft 202 is rotated in the first direction, eccentric bearing assembly 212 allows shaft 202 and converting roller 200 to rotate to advance sheet material 104. When shaft 202 is rotated in the second direction, eccentric bearing assembly 212 causes shaft 202 and converting roller 200 to be lowered.

Figure 14:
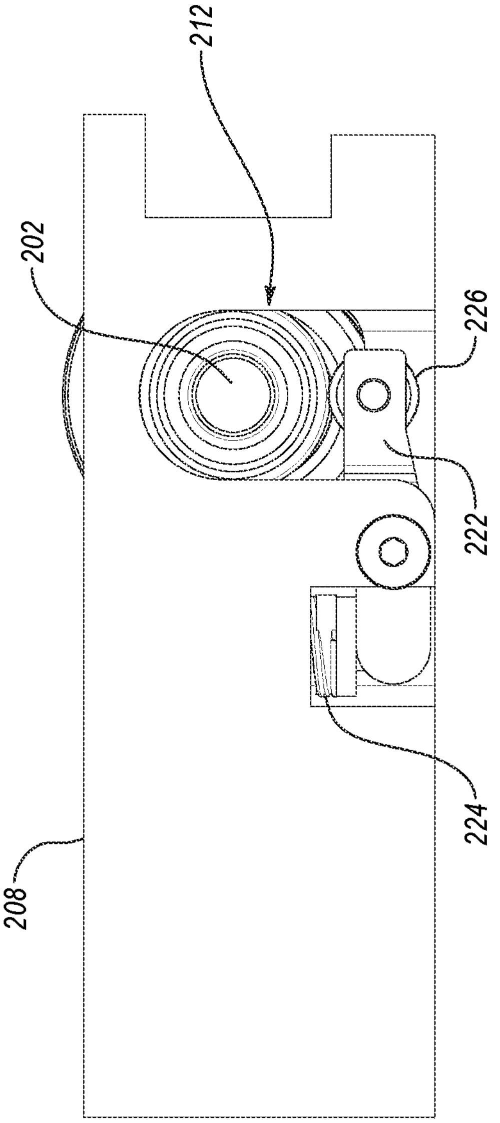
FIG. 14 illustrates a biasing mechanism for biasing an eccentric bearing assembly into a raised position.

Since the second end of shaft 202 is not connected to a belt like belt 148 that provide an upward force, bearing block 208 includes a biasing mechanism to return eccentric bearing assembly 212 to the raised position. As shown in FIG. 14, the biasing mechanism includes a pivot arm 222 pivotally connected to bearing block 208. A spring 224 is disposed between bearing block 208 and a first end of pivot arm 222. Spring 224 causes a second end of pivot arm 222 to rotate up against eccentric bearing assembly 212, thereby biasing eccentric bearing assembly 212 toward the raised position. Optionally, the second end of pivot arm 222 can include a bearing 226 that can reduce wear between pivot arm 222 and eccentric bearing assembly 212.

The arrangement of belt 148, feed rollers 134*a*, 134*b*, and converting roller 200 enables converting assembly 114 to utilize a single motor (e.g., stepper motor 146) to perform multiple functions. Specifically, stepper motor 146 may be used to advance sheet material 104 through converting assembly 114 by rotating active roller 134*a*. Stepper motor 146 may also be used to advance packaging templates 108 out of converting assembly 114 by rotating converting roller 200 in a first direction. Still further, stepper motor 146 may disengage longheads 152 for repositioning by rotating converting roller 200 in a second direction in order to lower converting roller 200.

Using a stepper motor in converting cartridge 130 (as opposed to a servo motor, for example) may provide various benefits. Stepper motors are more cost effective and accommodate a more favorable torque-curve, which enables a slimmer mechanical design. One common short-coming of stepper motors is that they lose much of their torque at higher speeds. In the present context, however, this property is advantageous because it requires a less rigid support structure to handle the higher torque of other motors. The lower torque at high speeds prevents moving components (e.g., crosshead 150, longheads 152, converting roller 200, etc.) from being damaged as a result of high energy collisions. Furthermore, stepper motors immediately stall when speeds are too high, thereby reducing the likelihood of a damaging collision, increasing reliability of components, as well as personal safety.

Figure 15:
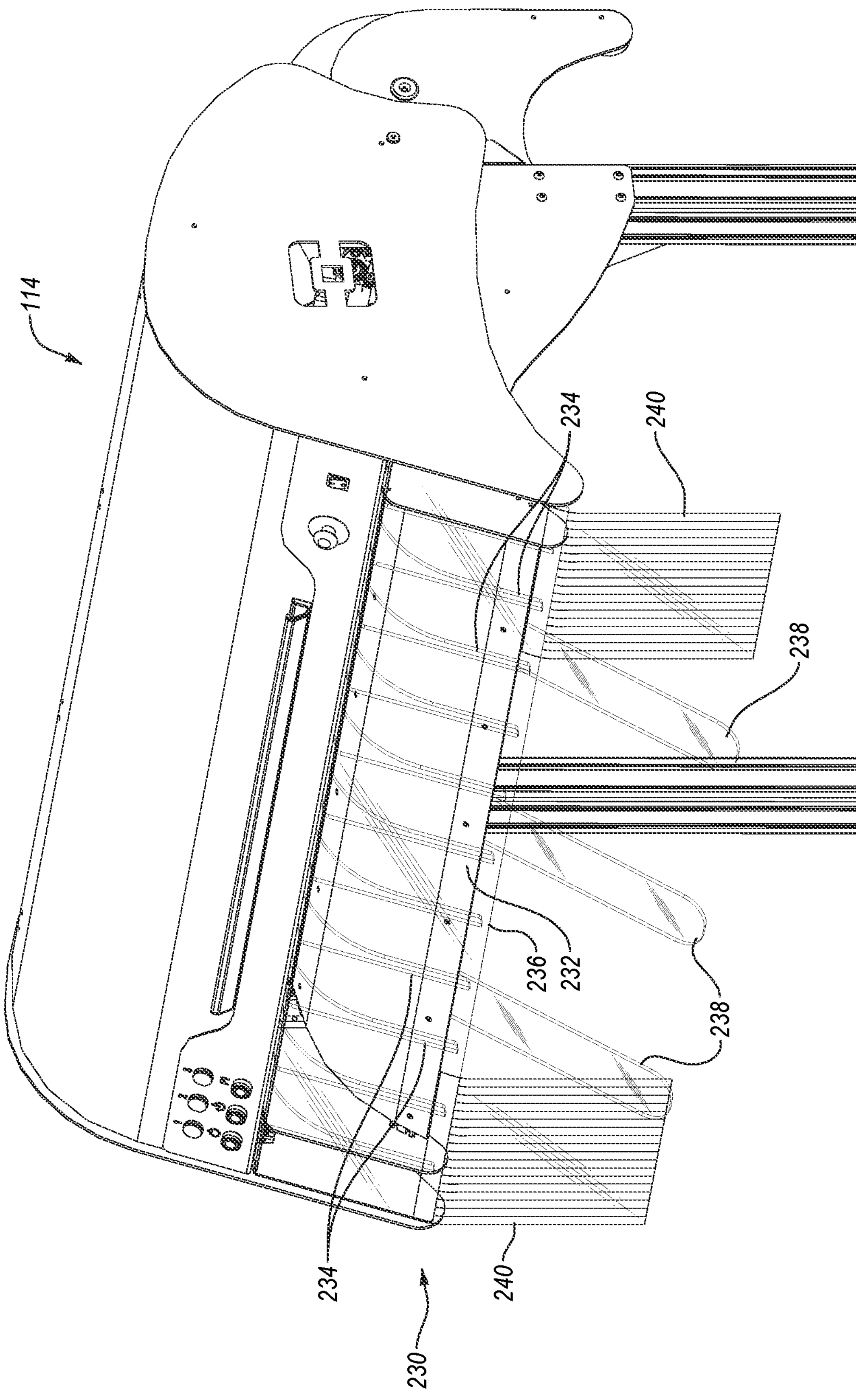
FIG. 15 illustrates a perspective view of an outfeed guide of the converting machine of FIG. 2.
Figure 16:
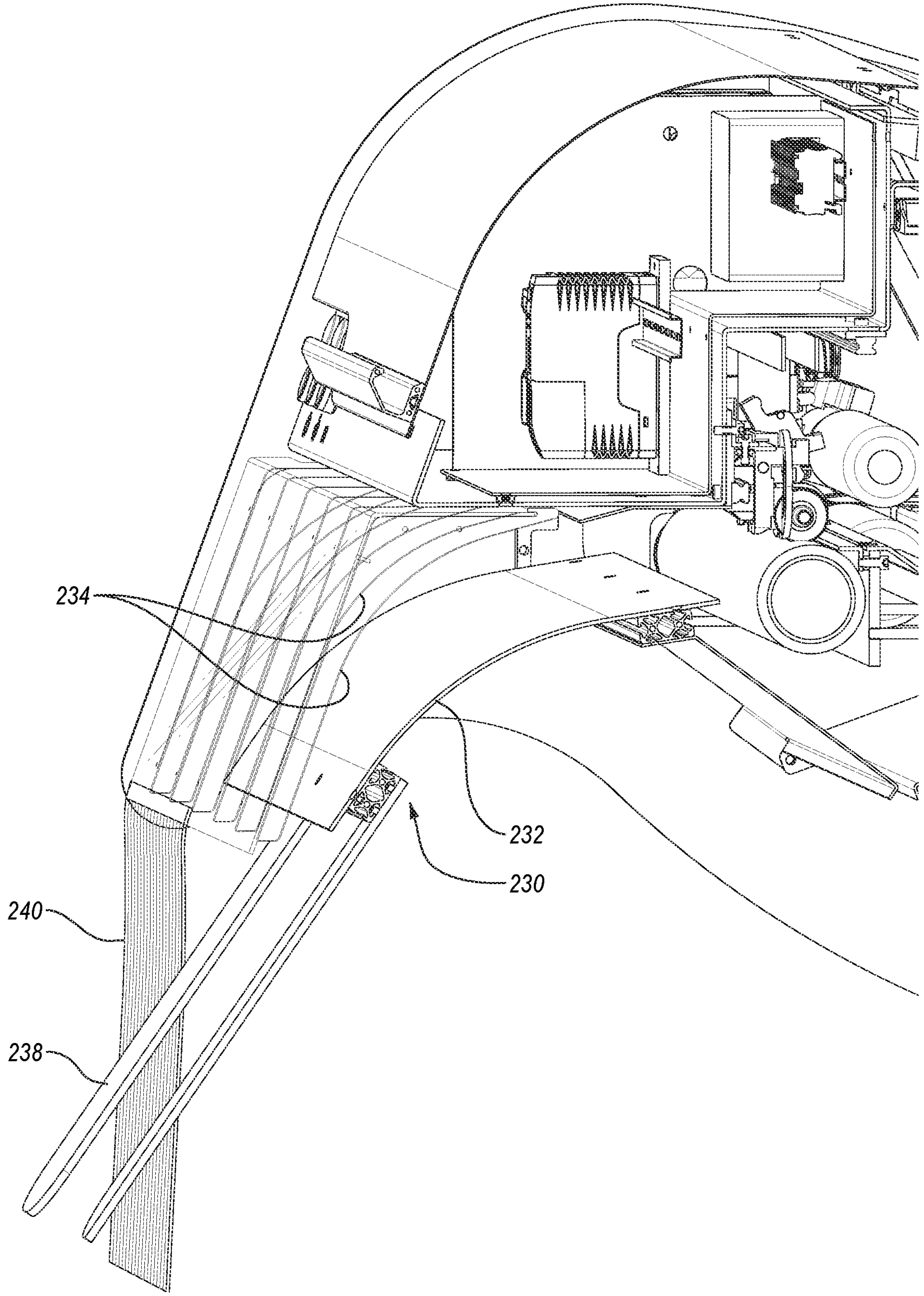
FIG. 16 illustrates a cutaway view of the converting machine of FIG. 2 to show the outfeed guide of FIG. 15.

Once converting assembly 114 has converted fanfold material 104 into packaging templates 108, packaging templates 108 may be fed out of converting assembly 114 through an outfeed guide 230 as shown in in FIGS. 15 and 16. Outfeed guide 230 may be configured to deflect and/or redirect packaging templates 108 from moving in one direction to another. For example, outfeed guide 230 may be configured to redirect packaging templates 108 from a first direction, which may be in a substantially horizontal plane (e.g., as sheet material 104 moves through converting assembly 114), to a second direction. The second direction may be angled relative to the first direction. For example, the first direction may be substantially horizontal, while the second direction may be at about a 70-degree angle relative to the first direction. Alternatively, the first direction and the second direction may form an acute or obtuse angle with respect to one another.

As shown, outfeed guide 230 includes a lower guide plate 232 and one or more upper guide teeth 234. Packaging templates 108 may be fed between lower guide plate 232 and one or more upper guide teeth 234. As can be seen, lower guide plate 232 and the one or more upper guide teeth 234 are curved and taper towards one another. As a result, lower guide plate 232 and the one or more upper guide teeth 234 cooperate to consistently guide packaging templates 108 out of converting assembly 114 at a predetermined and predictable location.

More specifically, lower guide plate 232 may support packaging templates 108 as they are fed out of converting assembly 114 so that packaging templates 108 consistently exit converting assembly at the same location. Similarly, the one or more upper guide teeth 234 may be configured to deflect and/or redirect packaging templates 108 from moving in the first direction to the second direction. The one or more upper guide teeth 234 may also be configured to maintain packaging templates 108 at a predetermined maximum distance from support structure 112. As illustrated, the one or more upper guide teeth 234 may have a generally arcuate surface that deflect and/or redirect packaging templates 108 toward the second direction so that packaging templates 108 do not extend significantly out of converting assembly 114 in a horizontal direction.

In the illustrated embodiment, a cover 236 is positioned over the one or more upper guide teeth 234. Cover 236 may prevent excess sheet material 104 from exiting converting assembly 114 without being deflected downward by the one or more upper guide teeth 234. Cover 236 may optionally be clear to allow for inspection of outfeed guide 230 as well as the interior of converting assembly 114.

In addition to lower guide plate 232 and the one or more upper guide teeth 234, outfeed guide 230 may also include outfeed extensions 238, 240. Extensions 238 extend from lower guide plate 232 so as to form an angle (e.g., between about 30 degrees and about 100 degrees; about 70 degrees, etc.) with the first direction of movement of sheet material 104. Extensions 238 are generally rigid so as to be able to guide packaging templates 108 horizontally away from support structure 112 and support at least a portion of packaging templates 108 after packaging templates 108 exit converting assembly 114. For instance, extensions 238 may guide and support packaging templates 108 so that packaging templates 108 hang from converting assembly 114 outside of collection bin 110, as shown in FIG. 1.

Extensions 240 extend from cover 236 near opposing sides of converting assembly 114. Extensions 240 may be flexible or rigid. In any case, extensions 240 may extend generally straight down from cover 236. Extensions 240 may be configured to deflect and/or direct excess sheet material 104 (such as side material cut off when forming packaging templates 108) into collection bin 110.

Converting assembly 114 may be connected to support structure 112 such that sheet material 104 is fed through converting assembly 114 in a first direction that is not in a horizontal plane. For instance, converting assembly 114 may be connected to support structure 112 such that sheet material 104 is fed through converting assembly 114 at an angle relative to a support surface on which converting machine 100 is positioned. The angle between the first direction and the support surface may be anywhere between 0 degrees to 90 degrees. Furthermore, converting assembly 114 may be movably connected to support structure 112 such that the angle between the first direction and the support surface may be selectively changed.

In a case where converting assembly 114 is connected to support structure 112 at an angle, the angle at which outfeed guide 230 feeds packaging templates 108 out converting assembly 114 may be changed. For instance, converting assembly 114 is angled so that sheet material 104 advances therethrough at an angle of 45 degrees relative to the support surface, outfeed guide 230 may feed packaging templates 108 out of converting assembly 114 in the same direction (e.g., so as to form a 45-degree angle with the support surface). Alternatively, outfeed guide 230 may feed packaging templates 108 out of converting assembly 114 at an angle relative to sheet material 104's direction of movement through converting assembly 114 (e.g., between about 30 degrees and about 100 degrees; about 70 degrees, etc.).

It will be appreciated that relative terms such as "horizontal," "vertical," "upper," "lower," "raised," "lowered," and the like, are used herein simply by way of convenience. Such relative terms are not intended to limit the scope of the present invention. Rather, it will be appreciated that converting assembly 114 may be configured and arranged such that these relative terms require adjustment. For instance, if converting assembly 114 is mounted on support structure 112 at an angle, converting roller 200 may move between a "forward position" and a "backward position" rather than between a "raised position" and a "lowered position."

Converting assembly 114 may include a cover assembly having one or more covers or doors that allow for ready access to converting cartridge 130. For instance, converting assembly 114 may include covers on one or both sides and/or one or more front and rear covers. The one or more covers may provide ready and convenient access to various portions of converting cartridge 130.

Figure 17:
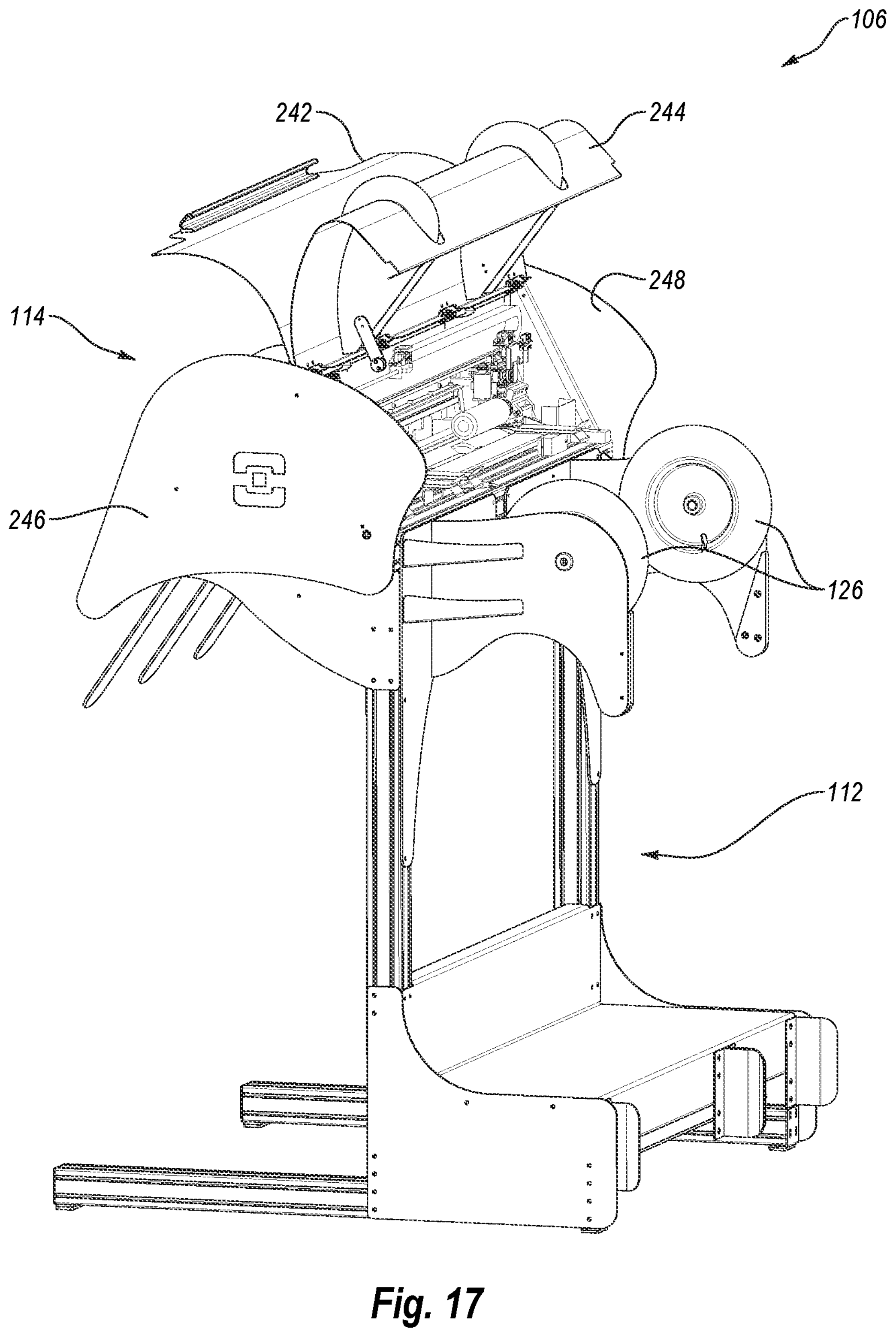
FIG. 17 illustrates a perspective view of the converting machine of FIG. 2 showing two access doors of a cover assembly open.
Figure 18:
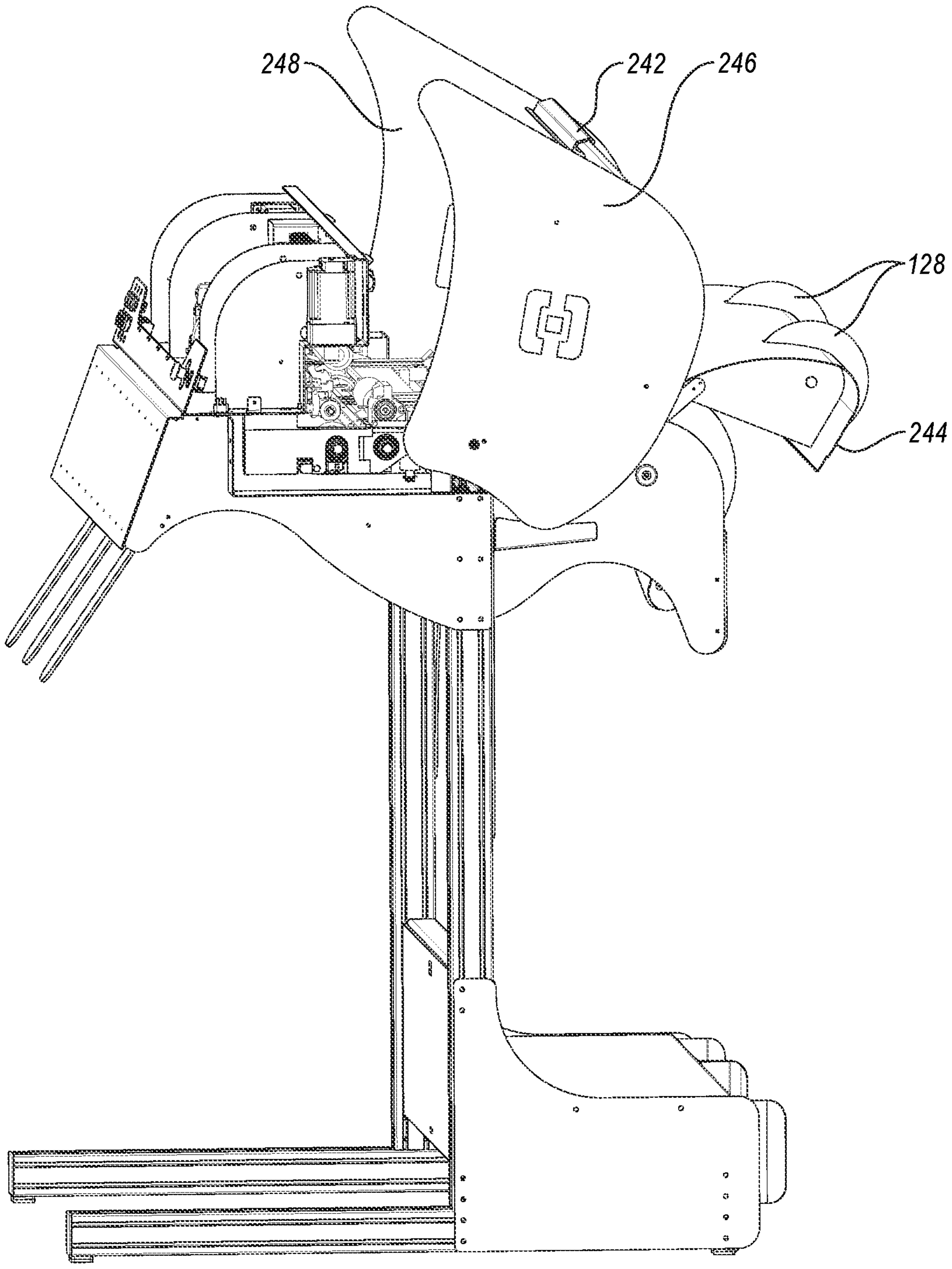
FIG. 18 illustrates a perspective view of the converting machine of FIG. 2 showing the entire cover assembly opened.

For instance, as shown in FIGS. 17 and 18, converting assembly 114 includes a cover assembly having a front cover 242, a rear cover 244, and opposing side covers 246, 248. Front cover 242 and rear cover 244 may be opened individually or together as shown in FIG. 17 in order to gain access to the interior of converting assembly 114, including converting cartridge 130. As shown, front cover 242 and rear cover 244 are pivotally connected to and between opposing side covers 246, 248.

The cover assembly (e.g., covers 242, 244, 246, 248) may also be opened as a unit as shown in FIG. 18 in order to provide greater access to or replacement of converting cartridge 130. For instance, rear cover 244 may be opened (as shown in FIG. 17) after which side covers 246, 248 may be pivoted back as shown in FIG. 18. Since front and rear covers 242, 244 are connected between side covers 246, 248, front and rear covers 242, 244 also rotate back when side covers 246, 248 are rotated back. Once covers 242, 244, 246, 248 are all rotated back, converting cartridge 130 may be serviced or replaced.

The present invention may be embodied in other specific forms without departing from its spirit or essential characteristics. Thus, the described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A converting machine used to convert sheet material into packaging templates for assembly into boxes or other packaging, the converting machine comprising:

a converting assembly configured to perform one or more transverse conversion functions and one or more longitudinal conversion functions on the sheet material, the one or more transverse conversion functions and the one or more longitudinal conversion functions being selected from the group consisting of creasing, bending, folding, perforating, cutting, and scoring, to create the packaging templates, the converting assembly comprising:

one or more longheads having one or more converting instruments that perform the one or more longitudinal conversion functions on the sheet material, wherein at least one of the one or more longheads is adapted to be selectively repositioned along a width of the converting assembly in order to make the one or more longitudinal conversion functions at different positions along the width of the sheet material, the at least one of the one or more longheads comprises a brake pivot arm that is configured to selectively pivot between a locked position and an unlocked position, the brake pivot arm being configured to engage a brake belt when the brake pivot arm is in the locked position to substantially prevent the at least one of the one or more longheads from being repositioned along at least a portion of the width of the converting assembly, the at least one of the one or more longheads being configured for selective repositioning along at least a portion of the width of the converting assembly when the brake pivot arm is in the unlocked position, at least one of the one or more longheads does not have any electrical or pneumatic actuators and is not connected to a cable chain or other conduit that transfers signals or energy.

2. The converting machine of claim 1, wherein the brake pivot arm comprises an engagement member that engages the brake belt when the brake pivot arm is in the locked position.

3. The converting machine of claim 1, wherein the converting assembly further comprises a crosshead having one or more converting instruments that perform the one or more transverse conversion functions on the sheet material, wherein the crosshead is selectively movable relative to the sheet material and along at least a portion of the width of the converting assembly in order to perform the one or more transverse conversion functions on the sheet material, wherein the crosshead is adapted to selectively engage and reposition the at least one of the one or more longheads along the width of the converting assembly.

4. The converting machine of claim 3, wherein the crosshead is slidably mounted on a track to facilitate the selective movement thereof along at least a portion of the width of the converting assembly.

5. The converting machine of claim 3, wherein the at least one of the one or more longheads comprises a longhead body to which the brake pivot arm is pivotally connected, wherein a spring is connected between the longhead body and the brake pivot arm to bias the brake pivot arm toward the locked position, wherein the crosshead selectively engages the brake pivot arm to pivot the brake pivot arm from the locked position to the unlocked position, wherein the crosshead comprises an actuator that selectively engages the brake pivot arm to selectively pivot the brake pivot arm from the locked position to the unlocked position.

6. The converting machine of claim 5, wherein the brake pivot arm comprises an extension and the crosshead comprises a notch, wherein the extension engages the notch when the crosshead pivots the brake pivot arm from the locked position to the unlocked position.

7. The converting machine of claim 6, wherein movement of the crosshead along at least a portion of the width of the converting assembly when the extension is engaged in the notch results in repositioning of the longhead along the width of the converting assembly.

8. A converting machine used to convert sheet material into packaging templates for assembly into boxes or other packaging, the converting machine comprising:

a converting assembly configured to perform one or more transverse conversion functions and one or more longitudinal conversion functions on the sheet material, the one or more transverse conversion functions and the one or more longitudinal conversion functions being selected from the group consisting of creasing, bending, folding, perforating, cutting, and scoring, to create the packaging templates, the converting assembly comprising:

a brake belt;

one or more longheads having one or more converting instruments that perform the one or more longitudinal conversion functions on the sheet material, at least one of the one or more longheads being selectively repositionable along a width of the converting assembly in order to make the one or more longitudinal conversion functions at different positions along the width of the sheet material, the at least one of the one or more longheads comprises a brake pivot arm that is selectively pivotable between a locked position and an unlocked position, the brake pivot arm being configured to engage the brake belt when the brake pivot arm is in the locked position, the engagement of the brake pivot arm and the brake belt substantially preventing the at least one of the one or more longheads from being repositioned along at least a portion of the width of the converting assembly, the at least one of the one or more longheads being free of any electrical or pneumatic actuators and connections to a cable chain or other conduit that transfers signals or energy to the at least one of the one or more longheads.

9. The converting machine of claim 8, wherein the brake pivot arm comprises an engagement member that engages the brake belt when the brake pivot arm is in the locked position.

10. The converting machine of claim 8, wherein the brake pivot arm is biased toward the locked position.

11. The converting machine of claim 8, wherein the at least one of the one or more longheads may be selectively repositioned along at least a portion of the width of the converting assembly when the brake pivot arm is in the unlocked position.

12. The converting machine of claim 8, wherein the converting assembly further comprises a crosshead selectively movable relative to the sheet material and along at least a portion of the width of the converting assembly in order to perform the one or more transverse conversion functions on the sheet material, wherein the crosshead is adapted to selectively engage and reposition the at least one of the one or more longheads along the width of the converting assembly, the crosshead comprising one or more converting instruments that perform the one or more transverse conversion functions on the sheet material.

13. The converting machine of claim 12, wherein the crosshead selectively engages the brake pivot arm to pivot the brake pivot arm from the locked position to the unlocked position.

14. The converting machine of claim 12, wherein the crosshead comprises an actuator that selectively engages the brake pivot arm to selectively pivot the brake pivot arm from the locked position to the unlocked position.

15. A converting machine used to convert sheet material into packaging templates for assembly into boxes or other packaging, the converting machine comprising:

a converting assembly configured to perform one or more transverse conversion functions and one or more longitudinal conversion functions on the sheet material, the one or more transverse conversion functions and the one or more longitudinal conversion functions being selected from the group consisting of creasing, bending, folding, perforating, cutting, and scoring, to create the packaging templates, the converting assembly comprising:

one or more longheads comprising a body and one or more cutting wheels or one or more creasing wheels that perform the one or more longitudinal conversion functions on the sheet material, at least one of the one or more longheads being selectively repositionable along a width of the converting assembly to make the one or more longitudinal conversion functions at different positions along a width of the sheet material;

a converting roller that may be selectively moved between a raised position and a lowered position between performance of successive longitudinal conversion functions by the one or more longheads, the converting roller being configured to support the sheet material when the one or more longheads perform the one or more longitudinal conversion functions on the sheet material, the converting roller being configured to engage at least one of the one or more cutting wheels or one or more creasing wheels of the one or more longheads when the converting roller is in the raised position, and the converting roller being configured to disengage the at least one of the one or more cutting wheels or one or more creasing wheels of the one or more longheads when the converting roller is in the lowered position and between performance of successive longitudinal conversion functions by the one or more longheads, such that the one or more longheads may be selectively repositioned along at least a portion of the width of the converting assembly.

16. The converting machine of claim 15, wherein at least one of the one or more longheads is free of any electrical or pneumatic actuators and connections to a cable chain or other conduit that transfers signals or energy to the at least one of the one or more longheads.

17. The converting machine of claim 16, further comprising a crosshead having one or more cutting wheels or one or more creasing wheels that perform the one or more transverse conversion functions on the sheet material, the crosshead being selectively movable relative to the sheet material and along at least a portion of the width of the converting assembly to perform the one or more transverse conversion functions on the sheet material, wherein the crosshead is adapted to selectively engage and reposition the at least one of the one or more longheads along the width of the converting assembly.

18. The converting machine of claim 15, wherein the at least one of the one or more longheads comprises a brake pivot arm that selectively pivots between a locked position and an unlocked position, wherein the brake pivot arm engages a brake belt when the brake pivot arm is in the locked position, which substantially prevents the at least one of the one or more longheads from being repositioned along at least a portion of the width of the converting assembly.

19. The converting machine of claim 18, wherein at least one of:

the brake pivot arm is biased toward the locked position; or the at least one of the one or more longheads may be selectively repositioned along at least a portion of the width of the converting assembly when the brake pivot arm is in the unlocked position.

* * * * *